United States Patent
Shukla et al.

(10) Patent No.: US 10,870,774 B2
(45) Date of Patent: *Dec. 22, 2020

(54) SILVER-CONTAINING PRECURSOR AND PRODUCT ARTICLES CONTAINING CELLULOSIC POLYMERS

(71) Applicant: Eastman Kodak Company, Rochester, NY (US)

(72) Inventors: Deepak Shukla, Webster, NY (US); Kevin M. Donovan, Bergen, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 560 days.

This patent is subject to a terminal disclaimer.

(21) Appl. No.: 15/456,868

(22) Filed: Mar. 13, 2017

(65) Prior Publication Data

US 2018/0258307 A1   Sep. 13, 2018

(51) Int. Cl.
*C09D 101/12* (2006.01)
*C09D 5/24* (2006.01)
(Continued)

(52) U.S. Cl.
CPC ............. *C09D 101/12* (2013.01); *C09D 5/24* (2013.01); *C09D 7/67* (2018.01); *C09D 7/68* (2018.01);
(Continued)

(58) Field of Classification Search
CPC ...... C08K 2003/0806; C08K 2201/001; C08K 2201/005; C08K 2201/011; C08K 3/04; C09D 101/12; C09D 11/03; C09D 11/14; C09D 11/38; C09D 5/24; C09D 7/67; C09D 7/68; C09D 11/322; C09D 11/36; C09D 11/037; C09D 11/324; C09D 11/033;
(Continued)

(56) References Cited

U.S. PATENT DOCUMENTS 7,329,301 B2   2/2008 Chang et al.
8,419,822 B2   4/2013 Li
(Continued)

FOREIGN PATENT DOCUMENTS

KR   20080035315 A  *  4/2008

OTHER PUBLICATIONS

Ji-Woon Kwon, et al., "Preparation of Silver Nanoparticles in Cellulose Acetate Polymer and the Reaction Chemistry of Silver Complexes in the Polymer," Bull. Korean Chem. Soc. 2005, vol. 26, No. 5, pp. 837-840.

*Primary Examiner* — Latosha Hines
(74) *Attorney, Agent, or Firm* — J. Lanny Tucker

(57) ABSTRACT

An article has a substrate and a pattern of a dry silver nanoparticle-containing composition comprising at least 20 weight % of one or more (a) polymers, that are cellulosic polymers; (d) silver nanoparticles having a mean particle size of 25-750 nm and present in an amount of 0.1-400 weight %, based on the total weight of the one or more (a) polymers; and (e) carbon black in an amount of 5-50 weight %, based on the total weight of the one or more (a) polymers. Such patterns can have multiple fine lines of any geometric arrangement. The article can have multiple patterns of this type, and each pattern can be electrolessly plated with a suitable metal such as copper to provide electrically-conductive product articles.

20 Claims, 7 Drawing Sheets

(51) Int. Cl.
    *C09D 11/38*     (2014.01)
    *C23C 18/16*     (2006.01)
    *C08K 3/04*     (2006.01)
    *C09D 11/14*     (2006.01)
    *C09D 7/40*     (2018.01)
    *C23C 18/31*     (2006.01)
    *C09D 11/322*     (2014.01)
    *C09D 11/36*     (2014.01)
    *C09D 11/037*     (2014.01)
    *C23C 18/40*     (2006.01)
    *C23C 18/20*     (2006.01)
    *C23C 18/18*     (2006.01)
    *C09D 11/324*     (2014.01)
    *C23C 18/30*     (2006.01)
    *C09D 11/033*     (2014.01)
    *C08K 3/08*     (2006.01)

(52) U.S. Cl.
    CPC .......... *C09D 11/033* (2013.01); *C09D 11/037* (2013.01); *C09D 11/14* (2013.01); *C09D 11/322* (2013.01); *C09D 11/324* (2013.01); *C09D 11/36* (2013.01); *C09D 11/38* (2013.01); *C23C 18/165* (2013.01); *C23C 18/1608* (2013.01); *C23C 18/1831* (2013.01); *C23C 18/1879* (2013.01); *C23C 18/2053* (2013.01); *C23C 18/30* (2013.01); *C23C 18/31* (2013.01); *C23C 18/405* (2013.01); *C08K 3/04* (2013.01); *C08K 2003/0806* (2013.01); *C08K 2201/005* (2013.01); *C08K 2201/011* (2013.01)

(58) Field of Classification Search
    CPC ... C23C 18/38; C23C 18/1608; C23C 18/405; C23C 18/2053; C23C 18/165; C23C 18/1879; C23C 18/1831; C23C 18/30
    See application file for complete search history.

(56) References Cited

U.S. PATENT DOCUMENTS

| | | |
|---|---|---|
| 9,188,861 B2 | 11/2015 | Shukla et al. |
| 9,207,533 B2 | 12/2015 | Shukla et al. |
| 2012/0225126 A1 | 9/2012 | Geckeler et al. |
| 2016/0108266 A1* | 4/2016 | Kosydar ................ C09D 11/38 522/8 |

* cited by examiner

SILVER-CONTAINING PRECURSOR AND PRODUCT ARTICLES CONTAINING CELLULOSIC POLYMERS

RELATED APPLICATIONS

Reference is made to the following commonly assigned patent applications, the disclosures of all of which are incorporated herein by reference:

U.S. Ser. No. 15/456,686 (filed on Mar. 13, 2017, by Shukla and Donovan) and entitled "Method of Forming Silver Nanoparticles Using Cellulosic Polymers" now abandoned; and U.S. Ser. No. 15/456,827 (filed on Mar. 13, 2017, by Shukla, Donovan, and Gillmor) and entitled "Silver-containing Compositions Containing Cellulosic Polymers," now granted as U.S. Pat. No. 10,214,657.

FIELD OF THE INVENTION

This invention relates to a Precursor articles containing one or more patterns containing silver nanoparticles mixed with cellulosic polymers and carbon black on a suitable substrate. The silver nanoparticles can be used as seed metal catalysts to form multiple electrolessly plated electrically-conductive metal patterns in product articles.

BACKGROUND OF THE INVENTION

It is well known that silver has desirable electrical and thermal conductivity, catalytic properties, and antimicrobial behavior. Thus, silver and silver-containing compounds have been widely used in alloys, metal plating processes, electronic devices, imaging sciences, medicine, clothing or other fibrous materials, and other commercial and industrial articles and processes to take advantage of silver's beneficial properties.

For example, silver compounds or silver metal have been described for use as metallic patterns or electrodes in metal wiring patterns, printed circuit boards (PCB's), flexible printed circuit boards (FPC's), antennas for radio frequency identification (RFID) tags, plasma display panels (PDP's), liquid crystal displays (LCD's), organic light emitting diodes (OLED's), flexible displays, and organic thin film transistors (OTFT's), among other electronic devices known in the art.

Rapid advances are also occurring for making and using various electronic devices for communication, financial, and archival purposes.

Silver is an ideal conductor having electrical conductivity 50 to 100 times greater than indium tin oxide that is commonly used today in many devices. For example, the art has described the preparation of electrically-conductive films by forming and developing (reducing) a silver halide image in "photographic" silver halide emulsions through an appropriate mask to form electrically-conductive grid networks having silver wires having average sizes (width and height) of less than 10 µm and having appropriate lengths.

While silver as an electrical conductor has a wide range of potential uses in the field of printed electronics, the microfabrication of electrically-conductive tracks (grids, wires, or patterns) by photolithographic and electroless techniques is time consuming and expensive, and there is an industrial need for direct digital printing to simplify the processes and to reduce manufacturing costs.

Furthermore, it is desirable to fabricate silver-containing electronics onto polymeric or similar temperature-sensitive substrates by solution-based printing processes. Metallic electrically-conductive wires or grids of low resistance must be achieved at sufficiently low temperatures so as to be compatible with organic electronics on polymeric substrates. Among various known methods for fabricating electrically-conductive silver grids or patterns, the direct printing of silver-containing inks provides attractive prospects for making such electrically-conductive patterns.

Inkjet printing and flexographic printing have also been proposed for providing patterns of silver or silver-containing compounds, requiring the careful fabrication of a silver-containing paste or "ink" with desirable surface tension, viscosity, stability, and other physical properties required for such application processes. High silver content has generally been required for high electrical conductivity, and calcination or sintering may be additionally required for increasing electrical conductivity of printed silver inks.

Some approaches to providing silver metal is to employ a chemical ink formulation where the silver source is a molecular precursor or cation (such as a silver salt) that is then chemically reacted (or reduced) to produce silver metal. Electrically-conductive inks that are in the form of a chemical solution rather than as a suspension or dispersion of metal particles, have gained interest in recent years. One conductive ink of this type is known as a Metalorganic Decomposition (MOD) variety ink, for example, as described by Jahn et al. [*Chem. Mater.* 22, 3067-3071 (2010)] who investigated silver printing using an aqueous transition metal complex [AgO$_2$C(CH$_2$OCH$_2$)$_3$H]-containing MOD ink. They reported the formation of metallic silver features having electrical conductivities as high as $2.7 \times 10^7$ S m$^{-1}$, which corresponds to an electrical conductivity that is 43% of that of bulk silver, although a sintering temperature of 250° C. was required.

U.S. Patent Application Publication 2015-0004325 (Walker et al.) describes a chemically-reactive silver ink composition comprised of a complex of a silver carboxylate salt and an alkylamine, in which the complex is used to form an electrically-conductive silver structure at a temperature of 120° C. or less. Unfortunately, even these temperatures render the ink incompatible with many polymeric and paper substrates used in flexible electronic and biomedical devices. Furthermore, since alkylamines are known to reduce silver at room temperature, long term stability of such compositions is tentative. Furthermore, the publication teaches long heating times were needed to obtain low resistivity in the resulting articles.

U.S. Pat. No. 8,419,822 (Li) describes a process for producing carboxylic acid-stabilized silver nanoparticles by heating a mixture of a silver salt, a carboxylic acid, and a tertiary amine. However, it has been observed that such silver-containing complexes are not thermally or light stable as the reducible silver ions are readily reduced under ambient light conditions, and the resulting electrical conductivity of silver particles is minimal.

Other industrial approaches to preparing electrically-conductive films or elements have been directed to formulating and applying photocurable compositions containing dispersions of metal particles such as silver metal particles to substrates, followed by curing the photocurable components in the photocurable compositions. The applied silver particles in the cured compositions can act as catalytic (seed) particles for electrolessly plated electrically-conductive metals. Useful electrically-conductive grids prepared in this manner are described for example, in U.S. Pat. No. 9,188,861 (Shukla et al.) and U.S. Pat. No. 9,207,533 (Shukla et al.) and in US Patent Application Publications 2014/

0071356 (Petcavich) and 2015/0125596 (Ramakrishnan et al.). Using these methods, photocurable compositions containing catalytic silver particles can be printed and cured on a suitable transparent substrate, for example a continuous roll of a transparent polyester film, and then electroless metal plating can be carried out on the catalytic silver particles. However, these methods require that high quantities of purchased silver particles be uniformly dispersed within the photocurable compositions so that coatings or printed patterns have sufficiently high concentration of catalytic sites. Without effective dispersing, silver particles readily agglomerate, leading to less ineffective electroless plating and electrical conductivity.

Moreover, forming stable patterns of silver particles in this manner requires the presence of photosensitive components such as polymerizable monomers or crosslinkable polymers that must be exposed to suitable radiation. Scaling such curing procedures to high volume use can be difficult and hard to reproduce on a consistent scale, especially for the production of fine line electrically-conductive meshes or grids where the uniformity and size of fine lines are subjected to highly rigorous standards.

Efforts are being directed in the industry to avoid the need for photocuring. For, example, U.S. Patent Application Publication 2012/0225126 (Geckeler et al.) describes a solid state method for preparing silver nanoparticles using a mixture of a silver salt and a water-soluble polymer such as a starch or cellulose derivative that acts as a silver ion reducing agent. The mixture is milled by a high-speed vibration milling process to form silver nanoparticles within the water-soluble starch or cellulosic polymer so that a solvent is not needed for synthesis or transportation of the silver nanoparticles.

Cellulose is a polydisperse linear homopolymer consisting of regioselective and enantioselective β-1,4-glycosidic linked D-glucose units. The homopolymer contains three reactive hydroxyl groups at the C-2, C-3 and C-6 atoms that are in general, accessible to the typical chemical conversions of primary and secondary —OH groups.

The use of cellulose together with its derivatives has wide spread applications, for example in fibers, films, plastics, coatings, suspension agents, composites. With the advent of synthetic polymers, their uses have somewhat diminished, but cellulose derivatives are still the raw materials of choice for some uses. In addition, various studies are on-going to look for and expand their use in existing and new technologies. Cellulosic polymers can be considered renewable resources in some instances. An inherent problem that faces users of cellulosic polymers is their general insolubility in most common solvents. Modifying the structure of cellulosic polymers can improve their solubility, leading to the synthesis of various cellulose derivatives (cellulosics) that come in all forms and structures depending on the functional group(s) used in place of the hydroxyl groups on the cellulose chain.

For example, cellulose derivatization can involve partial or full esterification or etherification of the hydroxyl groups on the cellulose chain by reaction with various reagents to afford cellulose derivatives like cellulose esters and cellulose ethers. Among all cellulose derivatives, cellulose acetate is recognized as the most important organic ester of cellulose owing to its extensive industrial and commercial importance. It has many uses such as in the production of plastic films, lacquers, photographic films, thermoplastic mouldings, transparent sheeting, camera accessories, magnetic tapes, combs, telephone, and electrical parts. Other common cellulose esters include cellulose acetate butyrate and cellulose acetate propionate, both of which are used in inks and coatings. Among some common cellulose ethers are methyl cellulose, hydroxyethyl cellulose, and carboxymethyl cellulose (CMC).

Properties of cellulose derivatives (esters and ethers) are determined primarily by the functional group. However, they can be modified significantly by adjusting the degree of functionalization and the degree of polymerization of the polymer backbone. For example, the chief difference between cellulose acetate butyrate and cellulose acetate propionate and precursor cellulose acetate is their solubility in a wider range of solvents.

Thus, cellulose derivatives exhibit different solution properties depending on the solvent system and the functional group(s) used to substitute the hydroxyl group(s) on cellulose chain. Cellulose esters such as cellulose nitrate and cellulose acetate dissolve in a wide range of solvents such as both aqueous and common organic solvents such as chloroform ($CHCl_3$), acetone, and N,N-dimethylformamide (DMF).

Solution to gel transitions have been observed in various cellulose derivatives, forming mostly physical gel systems. It is widely accepted that gelation is initiated by large macromolecular association leading to the formation of a three-dimensional network extending through the entire volume of the system (see Iliyna and Daragan in *Macromolecules* 1994, 27, 3759-3763). The transitions from solutions to gels have been studied using various techniques including rheological methods. Rheology has been determined to be the most direct method to determine sol-gel transitions in polymeric systems.

The solution properties of cellulose acetates have been well studied and have been shown to be influenced by the average degree of substitution and the distribution of substituents along the chain. Previous work on the gelation mechanism of cellulose acetate has shown interesting behavior with respect to the sol-gel transition. Cellulose acetate gels exhibit thermal reversible properties that depend on factors such as concentration, acetyl content, and the type of solvent. It is usually difficult to predict if cellulose will gel in a given organic solvent, and in most cellulose acetate/solvent systems, gelation occurs after the solution is heated to a specific temperature and subsequently cooled. For example, Kwon et al., *Bull. Korean Chem. Soc.* 26(5), 837-840 describe a study of silver nanoparticles in cellulose acetate solutions.

Despite all of the various approaches and efforts to provide electrically-conductive silver in various consumer and industrial articles described above, there remains a need for simpler and less expensive compositions and methods for generation of silver nanoparticles in a fashion suitable particularly for pattern formation in high speed manufacturing and electroless plating processes without the need for photocuring and complicated processes for making dispersions.

SUMMARY OF THE INVENTION

The present invention provides an article comprising a substrate, and having disposed on a supporting surface thereof a pattern of a dry silver nanoparticle-containing composition comprising:

at least 20 weight % of one or more (a) polymers, based on the total weight of the pattern, which one or more (a) polymers are selected from one or more of cellulose acetate, cellulose acetate phthalate, cellulose acetate butyrate, cellulose acetate propionate, cellulose acetate trimellitate, hydroxypropylmethyl cellulose phthalate, methyl cellulose, ethyl cellulose, hydroxypropyl cellulose, hydroxyethyl cellulose, hydroxypropylmethyl cellulose, and carboxymethyl cellulose;

(d) silver nanoparticles having a mean particle size of at least 25 nm and up to and including 750 nm, that are present in the pattern in an amount of at least 0.1 weight % and up to and including 400 weight %, based on the total weight of the one or more (a) polymers;

(e) carbon black in an amount of at least 5 weight % and up to and including 50 weight %, based on the total weight of the one or more (a) polymers; and less than 5 mol % of (b) reducible silver ions, based on the total molar amount of silver in the silver nanoparticle-containing composition.

This "precursor" article can be transformed in a product article by electrolessly plating the pattern with a suitable metal as described below.

The present invention provides a simple and inexpensive way to generate silver nanoparticles within a non-aqueous silver precursor composition comprising reducible silver ions and a cellulosic polymer, thereby creating a non-aqueous silver nanoparticle-containing composition. The method according to this invention can be readily used for manufacturing high weight fraction fully dispersed silver nanoparticles. The non-aqueous silver nanoparticle-containing compositions according to the present invention have long term stability as the silver nanoparticles do not readily agglomerate. These silver nanoparticle-containing compositions can be easily deposited or formed into patterns, and such patterns can be readily electrolessly plated with copper or another electrically-conductive metal. Thus, the use of preformed silver nanoparticles that must be kept dispersed within a solvent medium using binders or dispersants or complex formulations is avoided. In addition, the silver nano-particle-containing compositions do not require frequent mixing for uniformity and articles can be prepared according to the present invention without the need for photocuring.

The present invention provides these advantages by means of thermal treatment of the non-aqueous reducible silver ion precursor compositions comprising certain cellulosic polymers as silver ion reducing agents, and one or more organic solvents. The particular cellulosic polymers and organic solvents used in the non-aqueous silver precursor compositions thus facilitate silver ion reduction and provide physical stability of the resulting silver nanoparticles. The inventive compositions and methods can thus be used to provide precursor articles having applied silver nanoparticles, for example, in one or more patterns; and product articles that have electrolessly plated metals such as copper, in corresponding patterns.

Other advantages of the present invention would be readily apparent to one skilled in the art in view of the teaching provided herein.

DETAILED DESCRIPTION OF THE INVENTION

Figure 1:
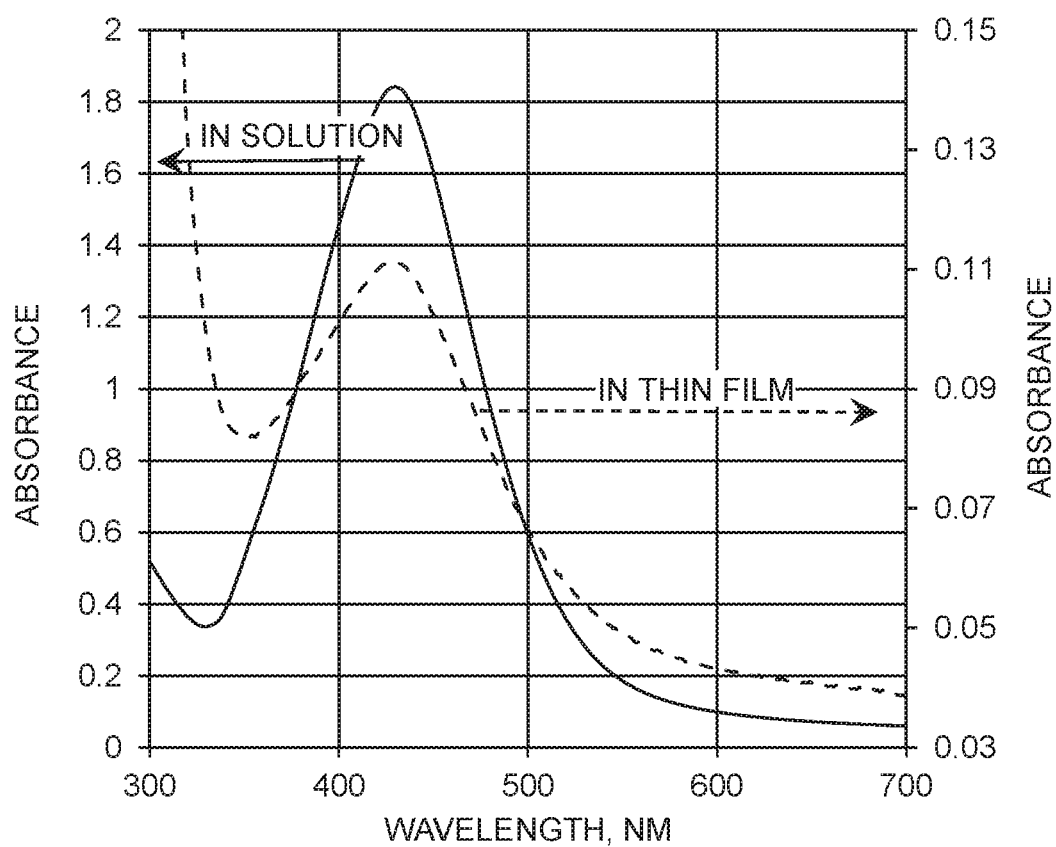
FIG. 1 is a graphical representation of Absorbance vs. Wavelength (nm) for the silver nanoparticle evaluation described in Invention Example 1 below.

The following discussion is directed to various embodiments of the present invention and while some embodiments can be desirable for specific uses, the disclosed embodiments should not be interpreted or otherwise considered be limit the scope of the present invention, as claimed below. In addition, one skilled in the art will understand that the following disclosure has broader application than is explicitly described and the discussion of any embodiment.

Definitions

As used herein to define various components of the non-aqueous silver precursor composition, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

Unless otherwise indicated, the term "weight %" refers to the amount of a component or material based on the total amount of a non-aqueous silver precursor composition or non-aqueous silver nanoparticle-containing composition. In other embodiments, "weight %" can refer to the % solids (or dry weight) of a dry layer, coating, thin film, silver wire, or silver-containing pattern.

Unless otherwise indicated, the term "non-aqueous" as applied to the non-aqueous silver precursor compositions and non-aqueous silver nanoparticle-containing compositions means that solvent media used to form such compositions are predominantly organic in nature and water is not purposely added but may be present in an amount of less than 5 weight % by virtue of being part of a chemical component, or particularly less than 1 weight %, or even less than 0.1 weight %, of the total weight of all solvents in the composition.

Unless otherwise indicated, the term "non-aqueous silver precursor composition" means that the silver present therein is predominantly (greater than 50 weight % of total silver) in the form of reducible silver ions.

Average dry thickness of silver nanoparticle-containing lines, grid lines, or other pattern features described herein can be the average of at least 2 separate measurements taken, for example, using electron microscopy, optical microscopy, or profilometry all of which should provide substantially the same results for the same test sample.

The use of "dry" in reference to thickness and width of lines, patterns, or layers, refers to embodiments in which at least 80 weight % of originally present organic solvent(s) has been removed.

As used herein for defining silver nanoparticles, "mean particle size" is measured using dynamic light scattering (DLS), that is sometimes referred to as Quasi-Elastic Light Scattering (QELS), and is a well-established technique for measuring the size and size distribution of molecules and particles typically in the submicron region, and even lower than 1 nm. Commercial DLS instruments are available from, for example Malvern and Horiba who also supply instructions for use of such equipment, and such equipment and accompany instructions can be used to characterize and carry out the present invention.

Boiling point of organic solvents described herein can be determined from known publications or measured using standard methods.

Unless otherwise indicated herein, viscosity can be determined at 25° C. using any standard commercially available viscometer.

Unless otherwise indicated, the term "group" particularly when used to define a substituent or a moiety, can itself be substituted or unsubstituted (for example an "alkyl group" refers to a substituted or unsubstituted alkyl group) by replacement of one or more hydrogen atoms with suitable substituents (noted below) such as a fluorine atom. Generally, unless otherwise specifically stated, substituents on any "groups" referenced herein or where something is stated to be possibly substituted, include the possibility of any groups, whether substituted or unsubstituted, which do not destroy properties necessary for the utility of the component or non-aqueous silver precursor composition. It will also be understood for this disclosure and claims that reference to a compound or complex of a particular general structure includes those compounds of other more specific formula that fall within the general structural definition. Examples of substituents on any of the mentioned groups can include known substituents such as: halogen (for example, chloro and fluoro); alkoxy, particularly those with 1 to 5 carbon atoms (for example, methoxy and ethoxy); substituted or unsubstituted alkyl groups, particularly lower alkyl groups (for example, methyl and trifluoromethyl), particularly either of those having 1 to 6 carbon atoms (for example, methyl, ethyl, and t-butyl); and other substituents that would be readily apparent in the art.

Unless otherwise indicated, all voltages described herein are measured versus SCE (saturated calomel electrode).

Uses

The deposition or patterning of functional electrodes, pixel pads, and conductive traces, lines and tracks, that meets electrical conductivity, processing, and cost requirements for practical applications has been a great challenge. Silver metal is of particular interest in the preparation of electrically-conductive elements for use in electronic devices because silver can be readily electrolessly plated for example using highly electrically-conductive copper.

The inventive non-aqueous reducible silver ion compositions described herein can be used for forming metallic silver patterns and electrodes for example in membrane touch switches (MTS), battery testers, biomedical, electroluminescent lamps, radio frequency identification (RFID) antenna, flat panel displays such as plasma display panel (PDP) and organic light emitting diode (OLED) displays, printed transistors and thin film photovoltaics, and thereby reduce the numbers of steps for pattern formation in such devices.

The non-aqueous silver precursor compositions described herein have a number of actual and potential uses in various technologies and industries. Most specifically, they can be used to provide silver metal for various purposes, including but not limited to, the formation of electrically-conductive grids or patterns of fine wires or other geometric forms, the formation of silver seed particles for electroless plating with other electrically-conductive metals, and the formation of silver in various materials for antimicrobial activity.

More specifically, the non-aqueous silver precursor compositions according to the present invention are particularly useful to provide silver metal as part of electrically-conductive metal patterns that are then electrolessly plated to provide electrically-conductive patterns. These electrically-conductive metal patterns can be incorporated into various devices including but not limited to, touch screens or other transparent display devices, and in modern electronics such as solar cell electrodes, electrodes in organic thin film transistors (OTFTs), flexible displays, radio frequency identification tags, light antennas, and other devices that would be readily apparent to one skilled in the art from the teaching herein. For example, silver nanoparticles formed according to the present invention can be used as catalytic sites for electrochemical (electroless) plating using copper or other metals to improve electrical conductivity of the resulting patterns.

Non-Aqueous Silver Precursor Compositions

In all embodiments, the non-aqueous silver precursor compositions according to the present invention contain three essential components for purposes of providing silver metal in the form of silver nanoparticles according to the present invention: one or more (a) polymers (cellulosic polymers) as described below; (b) reducible silver ions in the form of one or more silver salts or silver complexes as described below; and (c) an organic solvent medium consisting of (i) one or more hydroxylic organic solvents, and optionally one or more (ii) nitrile-containing aprotic or carbonate-containing aprotic solvents, or mixtures of both, all of which are different from the (i) hydroxylic organic solvents, as described below. No other components are purposely added to the non-aqueous silver precursor compositions according to the present invention, and as noted above, water is not purposely included. As described below, for some non-aqueous silver nanoparticle-containing compositions, (e) carbon black can be present as a fourth essential component for such compositions.

Upon thermal treatment as described below, the non-aqueous silver precursor composition according to this invention can be converted into a corresponding non-aqueous silver nanoparticle-containing composition comprising (d) silver nanoparticles in an amount of at least 0.1 weight % based on (or relative to) the total weight of the one or more (a) polymers. It is desirable that at least 90 mol %, at least 95 mol %, or even at least 98 mol % (which means "substantially all") of the (b) reducible silver ions are converted to (d) silver nanoparticles during this process.

The one or more (a) polymers, (b) reducible silver ions, (c) organic solvent medium can be combined in general by mixing them under suitable ambient conditions so that thermal reduction does not occur prematurely to any appreciable extent. Thus, components (a) and (b) can be added to the (c) organic solvent medium in any suitable order.

In general, the % solids of the non-aqueous silver precursor composition is at least 1% and up to and including 50%, or more typically of at least 5% and up to and including 20%. The amount of solids and (c) organic solvent medium, and viscosity, can thus be adjusted for a particular use.

The non-aqueous silver precursor composition is generally provided in liquid form having a viscosity of at least 1 centipoise (0.001 Pascal sec) and up to and including 5,000 centipoise (5 Pascal sec), or more likely a viscosity of at least 3 centipoise (0.003 Pascal sec) and up to and including 10 centipoise (0.01 Pascal sec), all measured at 25° C.

The non-aqueous silver nanoparticle-containing composition can have the same or different viscosity as the corresponding non-aqueous silver precursor composition. In most embodiments, the two compositions have essentially the same viscosity, that no more than 10% difference.

(a) Polymers:

The polymers useful in the practice of the present invention are organic in nature, and can be used singly or in mixtures of two or more different materials. When used in mixtures, the two or more different materials can be present in the same or different amounts within the total polymer amount. Both cellulose esters and cellulose ethers can be used in the present invention.

Representative useful polymers for the practice of the present invention are selected from one or more of cellulose acetate, cellulose acetate phthalate, cellulose acetate butyrate, cellulose acetate propionate, cellulose acetate trimellitate, hydroxypropylmethyl cellulose phthalate, methyl cellulose, ethyl cellulose, hydroxypropyl cellulose, hydroxyethyl cellulose, hydroxypropylmethyl cellulose, and carboxymethyl cellulose.

Particularly useful polymers according to the present invention include carboxymethyl cellulose, cellulose acetate butyrate, cellulose acetate propionate, cellulose acetate, and hydroxypropyl cellulose, individually or in mixtures.

The one or more polymers are present in a total amount of at least 1 weight % and up to and including 99.9 weight %, or more likely of at least 5 weight % and up to and including 30 weight %, or up to and including 50 weight %, based on the total weight of the non-aqueous silver precursor composition (including all solid materials and the organic solvent medium), or based on the total weight of the non-aqueous silver nanoparticle-containing composition.

Each of the useful polymers can be readily obtained from various commercial sources in the world, or they can be prepared using known starting materials, reaction conditions, and known synthetic procedures.

(b) Reducible Silver Ions:

Reducible silver ions can be provided in the non-aqueous silver precursor composition from many various sources as long as the silver salt or silver complex in which they are provided is soluble within the (c) organic solvent medium. For such silver salts and silver complexes, each has a solubility in a given (c) organic solvent medium of at least 1 g/liter at 20° C.

In general, silver salts or silver complexes comprised of any suitable organic or inorganic anion or complexed moiety (or combination of anions and complexed moieties) can be used in the practice of the present invention to provide the (b) reducible silver ions. Such silver complexes can be mononuclear, dinuclear, trinuclear, or higher and each compound generally has a net neutral charge. The following classes of useful reducible silver ion-containing salts and reducible silver ion-containing complexes are described as representative materials, but the present invention is not to be interpreted to be limited to them. Such reducible silver ion-containing materials can be readily purchased from various commercial sources or prepared using known procedures, starting materials, and reaction conditions, unless otherwise indicated.

(i) A first class of reducible silver ion-containing compounds are silver salts having organic or inorganic anions. Some representative silver salts include but not limited to, silver nitrate, silver acetate, silver benzoate, silver nitrite, silver thiocyanate, silver myristate, silver citrate, silver phenylacetate, silver malonate, silver succinate, silver adipate, silver phosphate, silver perchlorate, silver acetylacetonate, silver lactate, silver salicylate, silver oxalate, silver 2-phenylpyridine, silver trifluoroacetate; silver fluoride and silver fluoride complexes such as silver (I) fluorosulfate, silver (I) trifluoroacetate, silver (I) trifluoromethane sulfate, silver (I) pentafluoropropionate, and silver (I) heptafluorobutyrate; β-carbonyl ketone silver (I) complexes; silver proteins; and derivatives of any of these materials.

Useful silver complexes can be readily prepared using known procedures and some can be purchased from commercial sources.

(ii) Complexes of hindered aromatic N-heterocycle with (b) reducible silver ions can be used in the practice of this invention. The term "hindered" as used to define hindered aromatic N-heterocycle means that the moiety has a "bulky" group that is located in the α position to the nitrogen atom in the aromatic ring. Such bulky groups can be defined using the known "A-value" parameter that is a numerical value used for the determination of the most stable orientation of atoms in a molecule (using conformational analysis) as well as a general representation of steric bulk. A-values are derived from energy measurements of a mono-substituted cyclohexane ring. Substituents on a cyclohexane ring prefer to reside in the equatorial position to the axial. In the present invention, the useful "bulky" groups in the hindered aromatic N-heterocycle have an A-value of at least 0.05. Useful reducible silver ion-containing complexes of this type are described in U.S. Pat. No. 9,377,688 (Shukla), the disclosure of which is incorporated herein by reference for a further description of properties, representative compounds, and methods for preparing them.

(ii) Other useful complexes comprise (b) reducible silver ions are silver carboxylate-trialkyl, carboxylate-triaryl, and carboxylate-alkylaryl phosphite complexes and mixtures of these compounds. The terms "carboxylate-trialkyl phosphite" and "carboxylate-triaryl phosphite" are to be interpreted herein as indicating that the complex of which it is a part can have three of the same or different alkyl groups, or three of the same or different aryl groups, respectively. The term "carboxylate-alkylaryl phosphite" refers to a compound having a mixture of a total of three alkyl and aryl groups, in any combination. Useful reducible silver ion-containing complexes of this type are described in U.S. Pat. No. 9,375,704 (Shukla), the disclosure of which is incorporated herein by reference for a further description of properties, representative compounds, and methods for preparing them.

(iii) Silver-oxime complexes can be used to provide (b) reducible silver ions, and these materials are generally non-polymeric in nature (meaning that the silver complex molecular weight is less than 3,000). Useful non-polymeric silver-oxime complexes of this type are described in U.S. Pat. No. 9,387,460 (Shukla), the disclosure of which is incorporated herein by reference for a further description of properties, representative compounds, and methods for preparing them.

(iv) Other useful silver complexes comprising (b) reducible silver ions can be represented by the following Structure (V):

$$(Ag^+)_a(L)_b(P)_c \qquad (V)$$

wherein L represents an α-oxy carboxylate; P represents a 5- or 6-membered N-heteroaromatic compound; a is 1 or 2; b is 1 or 2; and c is 1, 2, 3, or 4, provided that when a is 1, b is 1, and when a is 2, b is 2.

Each of the complexes of Structure (V) comprises one or two reducible silver ions. Each reducible silver ion is complexed with one or two α-oxy carboxylate compounds that can be via two oxygen atoms provided from the same molecule of an α-oxy carboxylate compound, or oxygen atoms provided from two molecules of the same or different α-oxy carboxylate compounds.

The α-oxy carboxylate groups (moieties or components) can be defined in which the α-carbon atom attached directly to the carboxyl group [—C(=O)O-] has a hydroxy group, oxy, or an oxyalkyl substituent group. Thus, the α-oxy carboxylates can be either α-hydroxy carboxylates, α-alkoxy carboxylates, or α-oxy carboxylates. With the α-hydroxy carboxylates and α-alkoxy carboxylates, the remainder of the valences of that α-carbon atom can be filled with hydrogen or a branched or linear alkyl group (substituted or unsubstituted) as described below in more detail. In addition, the α-oxy carboxylate (L) generally has a molecular weight of 250 or less, or 150 or less.

In Structure (V) shown above, b is 1 or 2, and in the embodiments where b is 2, the two α-oxy carboxylate compounds within a single complex molecule can be the same or different compounds. In some embodiments of the present invention, L of Structure (V) described above can be represented by the following Structure (VI):

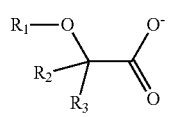

(VI)

wherein $R_1$, $R_2$, and $R_3$ are independently hydrogen or branched or linear alkyl groups. In most embodiments, at least one of $R_1$ through $R_3$ is a branched or linear alkyl group having from 1 to 8 carbon atoms, and any of the hydrogen atoms in such branched or linear alkyl groups can be replaced with a heteroatom such as a fluorine atom substituent.

Some particularly useful conjugate acids from which α-oxy carboxylates (L) of Structure (VI) can be selected from the group consisting of lactic acid, 2-hydroxybutyric acid, 2-hydroxy-3-methylbutyric acid, 2-hydroxy-3,3-dimethylbutyric acid, 2-hydroxy-isobutyric acid, 2-hydroxy-2-methylbutyric acid, 2-ethyl-2-hydroxybutyric acid, 2-hydroxy-2,3-dimethylbutyric acid, 2-ethyl-2-methoxybutyric acid, 2-methoxy-2-methylpropanoic acid, 1-hydroxycyclopentane-1-carboxylic acid, 2,3-dihydroxy-2,3-dimethylsuccinic acid, and 2,4-dihydroxy-2,4-dimethylpentanedioic acid. As noted above, mixtures of these materials can be used in a specific complex if desired.

In other embodiments, L is represented in Structure (V) by the following Structure (VII):

(VII)

wherein $R_4$ is a branched or linear alkyl group having 1 to 8 carbon atoms, including branched iso- and tertiary alkyl groups having 3 to 8 carbon atoms. In addition, any of the hydrogen atoms in any of the branched or linear alkyl groups optionally can be replaced with a fluorine atom; for example, the terminal carbon atom of a $R_4$ branched or linear alkyl group can have 1 to 3 fluorine atoms.

Some useful conjugate acids from which the α-oxy carboxylate (L) represented by Structure (VII) can be selected from the group consisting of pyruvic acid, 3-methylpyruvic acid, 3,3-dimethylpyruvic acid, 3,3-dimethyl-2-oxobutanoic acid, 3,3-dimethyl-2-oxopentanoic acid, and 2,3-dioxosuccinic acid.

The "P" compound of Structure (V) is a 5- or 6-membered N-heteroaromatic compound such as a 6-membered N-heteroaromatic compound. Such 5- or 6-membered N-heteroaromatic compounds can have a $pK_a$ of at least 10 and up to and including 22. An experimental method for measuring $pK_a$ and the $pK_a$ values of some N-heteroaromatic bases are known (for example, see Kalijurand et al. J. Org. Chem. 2005, 70, 1019).

In general, each 5- or 6-membered N-heteroaromatic compound is non-polymeric in nature and has a molecular weight of 200 or less. By "5- or 6-membered," it is meant that the N-heteroaromatic compound has either 5 or 6 atoms in the heterocyclic aromatic ring, at least one of which atoms is a nitrogen atom. In general, such heterocyclic aromatic rings generally have at least one carbon atom and at least one nitrogen atom in the ring.

In Structure (V) shown above, c is 1, 2, 3, or 4, and in the embodiments where c is 2, 3, or 4, the multiple 5- or 6-membered N-heteroaromatic compound molecules within the single complex molecule can be the same or different. For example, the 5- or 6-membered N-heteroaromatic compound can be selected from the group consisting of pyridine, 2-methylpyridine, 4-methylpyridine, 2,6-dimethylpyridine, 2,3-dimethylpyridine, 3,4-dimethylpyridine, 4-pyridylacetone, 3-chloropyridine, 3-fluoropyridine, oxazole, 4-methyloxazole, isoxazole, 3-methylisoxazole, pyrimidine, pyrazine, pyridazine, and thiazole.

Representative 5- or 6-membered N-heteroaromatic compounds can be readily obtained from various commercial chemical suppliers located in various countries.

Further details of properties, representative compounds, and methods of making them are provided in copending and commonly assigned U.S. Ser. No. 15/231,804 (filed Aug. 9, 2016 by Shukla), the disclosure of which is incorporated herein by reference. Of these types of reducible silver ion-containing complexes, a silver α-oxycarboxylate pyridine complex such as silver lactate pyridine complex, is particularly useful.

(v) Still other useful silver complexes are designed with one or two (b) reducible silver ions as described above for the (iv) silver complexes, complexed with both one or two α-oxy carboxylate molecules as described above for the (iv) silver complexes, and one, two, three, or four primary alkylamine molecules. In general, such useful silver complexes can be represented by the following Structure (VIII):

$$(Ag^+)_a(L)_b(P)_c \quad (VIII)$$

wherein L represents the α-oxy carboxylate; P represents the primary alkylamine; a is 1 or 2; b is 1 or 2; and c is 1, 2, 3, or 4, provided that when a is 1, b is 1, and when a is 2, b is 2.

In such complexes, P is a primary alkylamine having a boiling point of less than or equal to 175° C., or having a boiling point of less than or equal to 125° C., or even at least 75° C. and up to and including 125° C., at atmospheric pressure. The useful primary alkyl amines that generally have a molecular weight of less than 500 and are thus considered "non-polymeric" as defined by molecular weight and boiling point.

The term "primary alkylamine" refers herein to compounds that are non-aromatic and are not cyclic in structure. They generally have a one or more nitrogen atoms as long as all other features (molecular weight, pKa, boiling point, and oxidation potential) described herein are met. In such compounds, each of the nitrogen atoms has two valences filled by hydrogen atoms and the remaining valence of each nitrogen atom is filled with a substituted or unsubstituted alkyl group (not including alkylaryl groups such as benzyl group), or with a substituted or unsubstituted alkylene group for compounds defined herein as "primary alkyl diamines" that can be illustrated by the following Structure (IX):

$$H_2N-R_5-NH_2 \quad (IX)$$

wherein $R_5$ represents a substituted or unsubstituted, branched or linear, divalent alkylene group having 1 to 5 carbon atoms; and optional substituents include but are not limited to, fluoride atoms for any of the hydrogen atoms in the alkylene group.

In most useful embodiments, the primary alkyl amines comprise a single nitrogen atom and a single substituted or unsubstituted, branched or linear alkyl group having at least 3 carbon atoms, and generally from 3 to 6 carbon atoms, wherein any of the hydrogen atoms of the alkyl group can be replaced with a fluorine atom.

Representative useful primary alkylamines can be selected from the group consisting of a propylamine, n-butylamine, t-butylamine, isopropylamine, 2,2,2-trifluoroethylamine, 2,2,3,3,3-pentafluoropropylamine, 3,3,3-trifluoropropylamine, 1,2-dimethylpropylamine, t-amyl amine, and isopentylamine. Other useful primary alkylamines would be readily apparent to one skilled in the art. In some embodiments, the primary amine has an asymmetric carbon center on an alkyl chain. Some examples of such amines include but not limited to, a 2-amino-3-methylbutane, 3,3-dimethyl-2-butylamine, 2-aminohexane, sec-butylamine, and others that would be readily apparent to one skilled in the art from the foregoing description. Such primary alkylamines can be substituted with other groups that would be readily apparent to one skilled in the art.

Useful primary alkyl amines can be readily obtained from various worldwide commercial sources of chemicals.

Further details of properties, representative compounds, and methods of making them are provided in copending and commonly assigned U.S. Ser. No. 15/231,837 (filed Aug. 9, 2016 by Shukla), the disclosure of which is incorporated herein by reference.

(vi) Yet other useful reducible silver ion-containing complexes are designed with one or two (b) reducible silver ions as described above for the (iv) silver complexes, complexed with both one or two α-oxy carboxylate molecules as described above for the (iv) silver complexes, and one, two, three, or four oxime compound molecules. In general, each useful silver complex can be represented by the following Structure (X):

$$(Ag^+)_a(L)_b(P)_c \quad (X)$$

wherein L represents the α-oxy carboxylate; P represents an oxime compound; a is 1 or 2; b is 1 or 2; and c is 1, 2, 3, or 4, provided that when a is 1, b is 1, and when a is 2, b is 2.

In the noted Structure (X), the "P" compound is an oxime compound (or a mixture of two or more different oxime compounds). Traditionally, an "oxime" has a general formula of >C=N—OH. In the present invention, the term "oxime compound" is meant to include such compounds as well as compounds in which the hydrogen is replaced with a suitable monovalent radical. In general, the oxime compounds useful herein are not polymeric in nature and each has a molecular weight of 200 or less, or of 150 or less.

In Structure (X) shown above, c is 1, 2, 3, or 4, and in the embodiments where c is 2, 3, or 4, the P molecules within the single complex molecule can be the same or different oxime compounds.

For many embodiments, P can be an oxime compound that can be represented by the following Structure (XI):

wherein $R_5$ and $R_6$ are independently hydrogen or a substituted or unsubstituted alkyl group having 1 to 6 carbon atoms (linear or branched), provided that at least one of $R_5$ and $R_6$ is one of such alkyl groups. Alternatively, $R_5$ and $R_6$ can together represent the carbon atoms sufficient to provide a substituted or unsubstituted 5- or 6-membered, saturated carbocyclic ring, such as a substituted or unsubstituted pentane ring or substituted or unsubstituted cyclohexane ring.

$R_7$ is hydrogen, a substituted or unsubstituted alkyl group having 1 to 6 carbon atoms (linear or branched), a substituted or unsubstituted acyl group having 1 to 6 carbon atoms (linear or branched), a —C(=O)$R_8$ group, or a carbonyloxyalkyl group [—C(=O)O$R_8$], wherein $R_8$ is hydrogen or a substituted or unsubstituted alkyl having 1 to 6 carbon atoms (linear or branched).

Representative oxime compounds useful in the practice of the present invention include but are not limited to, acetoxime (acetone oxime), acetaldoxime, Aldicarb, dimethylglyoxime, methylethyl ketone oxime, propionaldehyde oxime, cyclohexanone oxime, cyclopentanone oxime, heptanal oxime, acetone-O-methyl oxime, acetaldehyde-O-methyl oxime, propionaldehyde-O-methyl oxime, butanaldehyde-O-methyl oxime, 2-butanone-O-methyl oxime, cyclopentanone-O-methyl oxime, and 2-butanone-O-ethyl oxime.

Some representative oxime compounds can be readily obtained from various commercial chemical suppliers such as Sigma Aldrich. Further details of properties, representative examples, and methods of making them are provided in copending and commonly assigned U.S. Ser. No. 15/362,868 (filed Nov. 29, 2016 by Shukla et al.), the disclosure of which is incorporated herein by reference.

In the non-aqueous silver precursor compositions according to the present invention, the amounts of the (b) reducible silver ions can be varied depending upon the particular manner in which the composition is to be used. For example, when the non-aqueous silver precursor composition is designed for the formation of fine lines containing silver nanoparticles, such as in fine line grids or meshes, the amount of (b) reducible silver ions is generally at least 0.1 weight % and up to and including 400 weight %, or typically at least 0.1 weight % and up to and including 200 weight %, or even at least 15 weight % and up to and including 50 weight %, all based on (or relative to) the total weight of the one or more (a) polymers (defined above). Such fine lines can generally have an average dry width of less than 20 μm, or more typically of less than or equal to 15 μm, and for example of at least 0.1 μm and up to and including 15 μm; and a dry height of less than 2 μm or typically less than 1 μm.

However, in those embodiments, where a uniform layer containing silver nanoparticles is desired, or where "large areas" (larger than the fine lines described above) are found, the amount of (b) reducible silver ions in the non-aqueous silver precursor compositions can be as low as at least 0.1 weight % and up to and including 5 weight %, or at least 0.25 weight % and up to and including 4 weight %, all based on (or relative to) the total weight of the one or more (a) polymers (defined above).

(c) Organic Solvent Medium:

In all embodiments of the non-aqueous silver precursor composition, the (a) and (b) components are dispersed or dissolved in an (c) organic solvent medium that consists of (i) one or more hydroxylic organic solvents, each of which has an α-hydrogen atom and properties defined below. This (c) organic solvent medium can also contain in some embodiments, (ii) one or more nitrile-containing aprotic solvents, one or more carbonate-containing aprotic solvents, or a combination of both types of aprotic solvents. These (ii) organic solvents are also defined below.

In general, for all organic solvents useful in the (c) organic solvent medium, both (i) and (ii) types, each has a boiling point at atmospheric pressure of at least 100° C. and up to but less than 500° C., or at least 135° C. and up to and including 350° C., or up to and including 250° C.

In some embodiments, the useful (i) hydroxylic solvent is an alcohol having an α-hydrogen atom. Accordingly, primary and secondary alcohols are useful and they can be monohydric or polyhydric. While either saturated or unsaturated alcohols can be used, it is desirable that the alcohol used be free from olefinic unsaturation. Suitable alcohols can be of either straight-chain or branched-chain configuration, and can contain in their structure either or both of alicyclic or aromatic carbon-to-carbon moieties. Representative examples of suitable straight-chain primary alcohols include but are not limited to, ethanol, n-propanol, n-butanol, n-pentanol, n-hexanol, 1-octanol, 2-ethyl-1-hexanol, n-decanol, ethylene glycol, propylene glycol, and benzyl alcohol. Representative examples of branched-chain alcohols include isobutyl alcohol, isoamyl alcohol, and secondary butyl carbinol. Secondary alcohols have greater reactivity. Representative examples of secondary alcohols include but are not limited to, isopropyl alcohol, secondary butyl alcohol, secondary amyl alcohol, diethyl carbinol, methyl isobutyl carbinol, methyl-3-heptanol, diisobutyl carbinol, dodecanol-Z, methyl allyl carbinol, cyclohexanol, methyl cyclohexyl carbinol, phenyl methyl carbinol, and similar materials. Combinations of any of these alcohols can be used if desired. Such materials can be readily purchased from various commercial sources or readily prepared using known starting materials, conditions, and reaction schemes.

Glycol ethers with both an ether and alcohol functional group in the same molecule are also useful in practice of the present invention. Representative examples of such glycol ethers include but are not limited to, 2-methoxyethanol, 2-ethoxyethanol, diethylene glycol monoethyl ether (carbitol), and methoxy isopropanol. Mixtures of these compounds can be used if desired. Such glycol ethers are commercially available.

In many embodiments, in addition to the (i) hydroxylic organic solvent(s), the organic solvent medium further contains one or more (ii) nitrile-containing aprotic solvents, one or more carbonate-containing aprotic solvents, or a mixture of one or more of both types of aprotic solvents.

Representative useful (ii) nitrile-containing aprotic solvents or carbonate-containing aprotic solvents include but are not limited to, benzonitrile, butyronitrile, propylene carbonate, ethylene carbonate, propionitrile, isovaleronitrile, or valeronitrile, or a combination of such compounds.

The relative volume amounts of each type of organic solvent in the original (c) organic solvent medium can vary widely. The nitrile-containing aprotic solvents or carbonate-containing aprotic solvents can be absent in some embodiments, but when present, the weight ratio of the total (ii) defined aprotic solvents to the total (i) hydroxylic solvents can be from 0.1:1 to and including 0.5:1.

Non-Aqueous Silver Nanoparticle-Containing Compositions

The reducible silver ions in the non-aqueous silver precursor composition according to the present invention can be converted it silver nanoparticles to provide a corresponding non-aqueous silver nanoparticle-containing composition. Details about such conversion are provided below.

(e) Carbon Black:

As described below, (e) carbon black can be added to the non-aqueous silver nanoparticle-containing compositions at a suitable time. Carbon black can be obtained commercially in various forms. The (e) carbon black can be added so that it is present it is presence in an amount of at least 5 weight %, based on (or relative to) the total weight of the one or more (a) polymers. Typically, the amount of (e) carbon black is at least 5 weight % and up to and including 50 weight %, or more typically in an amount of at least 5 weight % and up to and including 25 weight %, based on (or relative to) the total weight of the one or more (a) polymers.

The steady shear measurements of the non-aqueous silver nanoparticle-containing compositions prepared according to the present invention can be performed by subjecting a composition sample to a steady shear at a constant shear rate ($\gamma\bullet$) resulting in a generation of a shear stress ($\tau$). The corresponding shear stress ($\tau$) on the sample was measured using a torque transducer. The viscosity ($\eta$) was measured as function of the steady shear rate2($\gamma\bullet$) and is defined as:

$$\eta = \tau/\gamma\bullet$$

Solutions of one or more (a) polymers typically exhibit a zero shear viscosity, $\eta_o$, that is typified by constant viscosity (Newtonian region) at low shear rates and a decrease in viscosity (shear thinning) at high shear rates. Accordingly, useful non-aqueous silver nanoparticle-containing compositions prepared according to the present invention exhibit Newtonian behavior at low shear rate and exhibit a low slope of viscosity vs. shear rate <1 in the shear thinning region at higher shear rates. A fit of the Carreau model to the non-Newtonian steady-shear data provides parameters that characterize the rheology of these compositions, as follows:
Carreau Equation:

$$\eta = \eta_o[1 + (\lambda\gamma)^a]^{\frac{n-1}{a}}$$

wherein:
$\eta_o$ is the zero-shear viscosity that becomes constant at low shear rates;
a is the exponent that defines the shape of the transition from the zero-shear viscosity to the shear thinning or power law region;
n is the parameter defining the slope in the power law region;
$\lambda$ is a time constant for the fluid that relates to its relaxation time; and
$\gamma$ is shear rate.

The non-aqueous silver nanoparticle-containing compositions prepared according to the present inventions exhibit different solution properties depending upon the organic solvent medium and the functional group(s) used to substitute the hydroxyl group(s) on a cellulose chain. Since solution to gel transitions have been observed in various cellulosic polymers, forming mostly physical gel systems, it is important to characterize the dynamic viscoelastic behavior of the compositions described herein. Dynamic mechanical analysis (DMA) was used for determination of gel formation. Compositions that form gel in certain organic solvents are not useful in the practice of the present invention.

Measuring dynamic viscoelastic behavior involves the application of a sinusoidally varying strain $\gamma=\gamma_o \sin(\epsilon t)$ in the linear viscoelastic (LVE) region. The symbol $\omega$ is the frequency of oscillations and $\gamma_o$ is the strain amplitude. The shear stress ($\tau$) generated is also sinusoidal in nature given by the expression:

$\tau=\tau_o \sin(\omega t+\delta)$.

Expanding the above expression results in two components for the stress, one in phase and one out of phase with the strain:

$\tau=\tau_o \cos(\delta)\sin(\omega t)+\tau_o \sin(\delta)\cos(\omega t)$

The elastic or storage modulus, G', is related to the stress component in phase with the strain and is defined as:

$G'=\tau_o \cos(\delta)/\gamma_o$

While the viscous or loss modulus G" is related to the stress component out of phase, with the strain and is given by:

$G''=\tau_o \sin(\delta)/\gamma_o$,

G' provides information on the energy stored by the sample, and G" is related to the energy dissipated by the sample. Thus, for a perfect elastic system, $\delta=0$ and G' assumes a finite value while G"=0. Alternatively, for a purely viscous system, $\delta=90°$ with G" having a finite value with G'=0. Most materials (for example, polymer melts) exhibit both elastic and viscous properties and are referred to as viscoelastic materials. Therefore, for viscoelastic materials, both G' and G" will have non-zero values. Plots of G' and G" as a function of frequency provide information regarding the structure of a material being evaluated. For a liquid sample, G' and G" have slopes close to 2 and 1, respectively, on a log-log plot of modulus vs. frequency at low frequencies that are defined as their terminal slopes in the flow region.

At low frequencies, Tan $\delta$, is defined as the ratio of G"/G' that is measured at a given frequency. Tan $\delta$ is >1, when the sample exhibits mostly viscous characteristics and Tan $\delta$ that is <1 is dominated by elastic behavior. The point of intersection of G' and G" (overlap frequency) provides information on the relaxation time. As an elastic network is formed, the slopes of both G' and G" decrease to a point where G' is parallel but just below G" and both slopes are equal to 0.6, which is defined as the gel point or point where a connective network has spanned the entire sample. As the network increases, G' dominates G" and Tan $\delta$ becomes <1. For an elastic gel network, both moduli exhibit frequency independent behavior and G' is significantly larger than G". For a dynamic frequency analysis to be valid, the experiments have to be conducted within the LVE region.

Each of the non-aqueous silver nanoparticle-containing compositions prepared according to the present inventions exhibits a viscoelastic response, Tan $\delta$ value, of at least 15, or typically at least 30, or even at least 40, and up to and including 150, all measured at 25° C., using an Anton Paar MCR 501 rheometer and couette geometry at a frequency of 10 radians/sec (see for example, Ferry, J., "Viscoelastic Properties of Polymers", Wiley and Sons, New York, 1961).

Precursor Articles

The non-aqueous silver precursor compositions according to the present invention can be used to provide "precursor" articles that can then be used in various operations to provide electrically-conductive metal-containing thin layers or electrically-conductive metal-containing patterns in various "product articles" as described below.

As used herein, the term "precursor article" refers to an article (or element) typically designed to have a substrate having thereon a dry layer or dry pattern comprising a silver nanoparticle-containing composition and thus, are articles in which silver ion reduction to (d) silver nanoparticles has already occurred and there are no appreciable amounts of (b) reducible silver ions, that is they are generally present in an amount of less than 5 mol %, based on the total amount of silver in the corresponding silver nanoparticle-containing composition.

Thus, each of the precursor articles according to the present invention comprises a substrate (described below), and has disposed on at least one supporting surface thereof a pattern of a dry silver nanoparticle-containing composition comprising:

at least 20 weight %, or at least 50 weight %, and up to and including 90 weight %, or up to and including 99.9 weight %, all based on the total weight of the pattern of the dry silver nanoparticle-containing composition, of one or more (a) polymers selected from one or more of cellulose acetate, cellulose acetate phthalate, cellulose acetate butyrate, cellulose acetate propionate, cellulose acetate trimellitate, hydroxypropylmethyl cellulose phthalate, methyl cellulose, ethyl cellulose, hydroxypropyl cellulose, hydroxyethyl cellulose, hydroxypropylmethyl cellulose, and carboxymethyl cellulose;

(d) silver nanoparticles having a mean particle size of at least 25 nm and up to and including 750 nm, or of at least 50 nm and up to and including 500 nm, or even of at least 50 nm and up to and including 300 nm; and (e) carbon black in an amount of up to and including 50 weight %, or at least 5 weight % and up to and including 50 weight %, or even at least 5 weight % and up to and including 25 weight %, all based on (or relative to) the total weight of the one or more (a) polymers;

less than 5 mol % of (b) reducible silver ions, or less than 2 mol %, or even less than 1 mol %, all based on the total molar amount of silver in the pattern of the dry silver nanoparticle-containing composition;

wherein the (d) silver nanoparticles are present in the pattern in some embodiments in an amount of at least 0.1 weight % and up to and including 400 weight %, or at least 15 weight % and up to and including 200 weight %; and in other embodiments, in an amount of at least 0.1 weight % and up to and including 5 weight %, or at least 0.25 weight % and up to and including 4 weight %, all based on (or relative to) the total weight of the one or more (a) polymers.

When one or more patterns of the dry silver nanoparticle-containing composition are formed on the substrate, in some embodiments, at least one of the patterns can comprise a combination of fine lines, each fine line having an average dry width of at least 1 μm and up to and including 20 μm, which combination of fine lines can be arranged in parallel, crossing at any desired angle, a combination thereof, or in a random arrangement. In other words, each pattern can be designed to have any predetermined grid pattern that can be achieved in the art.

The presence of the (e) carbon black in the silver nanoparticle-containing composition (and resulting patterns) is particularly advantageous when the substrate (described in detail below) is transparent, such as a transparent continuous polymeric film for example a transparent continuous polycarbonate, polystyrene, or polyester film.

In many embodiments of "precursor" articles, the substrate has a first supporting surface and a second opposing supporting surface, and one or more dry patterns of the silver nanoparticle-containing composition are disposed on the first supporting surface, and optionally, one or more dry patterns of the same or different silver nanoparticle-containing composition are disposed on the second opposing supporting surface. The dry patterns can be disposed on the two opposing supporting surfaces in any opposing arrangement, that is either directly opposite one another, or offset in some desired arrangement.

For example, in some embodiments of the article, the substrate is a transparent continuous polyester film that has a first supporting surface and a second opposing supporting surface, the article further comprising multiple (two or more) individual dry patterns formed on the first supporting surface which dry patters comprise the same or different silver nanoparticle-containing compositions, and further comprising multiple (two or more) individual dry patterns formed on the second opposing supporting surface which opposing multiple dry patterns comprise the same or different silver nanoparticle-containing compositions.

For example, in such embodiments, all of the multiple individual dry patterns on both the first supporting surface and the second opposing supporting surface can comprise the same silver nanoparticle-containing composition, the (d) silver nanoparticles in each individual dry pattern having a mean particle size of at least 50 nm and up to and including 300 nm, and each of the multiple individual dry patterns comprises fine lines having an average dry width of at least 1 μm and up to and including 20 μm.

As used herein, the term "product" article refers to an article (or element) in which an electrolessly plated copper pattern has been formed or disposed solely on the corresponding pattern of a silver nanoparticle-containing composition as described above. Thus, each of such product articles according to the present invention is derived from a "precursor" article according to the present invention, and comprises a substrate as described below (for example a transparent substrate of some type), and has disposed on a supporting surface thereof a pattern of electrolessly plated copper that is disposed solely on a corresponding pattern of a dry silver nanoparticle-containing composition as described above, comprising:

at least 20 weight % or at least 50 weight % and up to and including 90 weight %, or up to and including 99.9 weight %, of one or more (a) polymers as described above, all based on the total weight of the corresponding pattern of the dry silver nanoparticle-containing composition;

(d) silver nanoparticles having a mean particle size of at least 25 nm and up to and including 750 nm, or of at least 50 nm and up to and including 500 nm, or even of at least 50 nm and up to and including 300 nm; and (e) carbon black in an amount of up to and including 50 weight % (or at least 5 weight % and up to and including 50 weight %, or at least 5 weight % and up to and including 25 weight %), all based on (or relative to) the total weight of the one or more (a) polymers;

less than 5 mol % of (b) reducible silver ions, or less than 2 mol %, or even less than 1 mol %, all based on the total molar amount of silver in the pattern of the dry silver nanoparticle-containing composition;

wherein the (d) silver nanoparticles are present in the pattern in some embodiments in an amount of at least 0.1 weight % and up to and including 400 weight %, or at least 15 weight % and up to and including 200 weight %; and in other embodiments, in an amount of at least 0.1 weight % and up to and including 5 weight %, or at least 0.25 weight % and up to and including 4 weight %, all based on (or relative to) the total weight of the one or more (a) polymers.

In many product articles according to this invention, the pattern of electrolessly plated copper comprises a combination of fine lines, each fine line having an average dry width of at least 1 μm and up to and including 20 μm, which combination of fine lines can be arranged in parallel, crossing at any desired angle, a combination thereof, or in a random arrangement. In other words, each pattern can be designed to have any predetermined grid pattern that can be achieved in the art.

In some embodiments of product articles, the substrate has a first supporting surface and a second opposing supporting surface, and one or more patterns of electrolessly plated copper are disposed on the first supporting surface, and optionally, one or more patterns of electroless plated copper are disposed on the second opposing supporting surface.

Moreover, the substrate can be a transparent continuous polyester film that has a first supporting surface and a second opposing supporting surface, and the product article further comprises multiple (two or more) individual patterns of electrolessly plated copper formed on the first supporting surface, and further comprising multiple (two or more) individual patterns of electrolessly plated copper formed on the second opposing supporting surface.

For example, in such product articles, all of the multiple individual patterns of electrolessly plated copper on both the first supporting surface and the second opposing supporting surface can be formed on the same corresponding silver nanoparticle-containing composition, the (d) silver nanoparticles in each individual pattern of electrolessly plated copper having a mean particle size of at least 50 nm and up to and including 300 nm, and each of the multiple individual patterns of electrolessly plated copper comprising fine lines having an average dry width of at least 1 μm and up to and including 20 μm.

Both precursor articles and product articles described herein comprise a suitable substrate that generally has two planar surfaces: a first supporting side (or surface) and a second opposing supporting side (or surface). Such substrates can have any suitable form such as sheets of any desirable size and shape, webs of metals, films, and elongated fibers or woven fibers (such as in webs of textiles) or other porous materials, and especially continuous webs of various transparent, translucent, or opaque polymeric materials (such as polycarbonates and polyesters) that can be supplied, used, or stored as rolls.

More specifically, a uniform thin film or one or more thin film patterns of the silver nanoparticle-containing composition are provided in a suitable manner on one or more supporting (planar) sides of a suitable substrate to provide a precursor article as described according to the method described below. Typically, such precursor articles have an initially "wet" organic solvent-based layer or pattern during and immediately after application to the substrate but the organic solvent medium can be removed as described below to provide the desired uniform thin film layer or one or more thin film patterns.

Suitable substrates can be composed of any suitable material as long as it does not inhibit the purpose of the present invention to form electrolessly plated copper or other metal patterns. For example, substrates can be formed from materials including but are not limited to, polymeric films, metals, glasses (untreated or treated for example with tetrafluorocarbon plasma, hydrophobic fluorine, or a siloxane water-repellant material), silicon or ceramic materials such as ceramic wafers, fabrics, papers, and combinations thereof (such as laminates of various films, or laminates of papers and films) provided that a uniform thin film or thin film pattern can be formed thereon in a suitable manner and followed by thermal treatment (heating) on at least one supporting surface thereof. The substrate can be transparent, translucent, or opaque, and rigid or flexible. The substrate can include one or more auxiliary polymeric or non-polymeric layers or one or more patterns of other materials before the non-aqueous silver nanoparticle-containing composition is applied according to the present invention.

More specifically, suitable substrate materials for forming precursor and product articles according to the present invention include but are not limited to, metallic films or foils, metallic films on polymer, glass, or ceramic materials, metallic films on electrically conductive film supports, semiconducting organic or inorganic films, organic or inorganic dielectric films, or laminates of two or more layers of such materials. Useful substrates can include transparent polymeric films such as poly(ethylene terephthalate) films, poly (ethylene naphthalate) films, polyimide films, polycarbonate films, polyacrylate films, polystyrene films, polyolefin films, and polyamide films, silicon and other ceramic materials, metal foils such as aluminum foils, cellulosic papers or resin-coated or glass-coated papers, glass or glass-containing composites, metals such as aluminum, tin, and copper, and metalized films. Porous fabrics, glasses, and polymeric webs can also be used.

Particularly useful substrates including continuous flexible polymeric films, metal foils, and textile webs. Useful continuous flexible polymers films include transparent continuous polymeric films such as transparent continuous polyester films such as films of poly(ethylene terephthalate), polycarbonate films, or poly(vinylidene chloride) films with or without surface-treatments or coatings as noted below.

For example, either or both supporting surfaces of the substrate can be treated with a primer layer or electrical or mechanical treatments (such as graining) to render that surface "receptive" and improve adhesion of the silver nanoparticle-containing composition and resulting electrolessly plated copper or other metal. An adhesive layer can have various properties in response to stimuli (for example, it can be thermally activated, solvent activated, or chemically activated). Useful adhesive materials of this type are described for example in [0057] of U.S. Patent Application 2008/0233280 (Blanchet et al.), the disclosure of which is incorporated herein by reference. A separate receptive layer can have any suitable dry thickness of at least 0.05 μm when measured at 25° C.

The two (planar) supporting surfaces of the substrate, especially polymeric substrates, can be treated by exposure to corona discharge, mechanical abrasion, flame treatments, or oxygen plasmas, or coated with various polymeric films, such as poly(vinylidene chloride) or an aromatic polysiloxane as described for example in U.S. Pat. No. 5,492,730 (Balaba et al.) and U.S. Pat. No. 5,527,562 (Balaba et al.) and U.S. Patent Application Publication 2009/0076217 (Gommans et al.), the disclosures of all of which are incorporated herein by reference.

Useful substrates can have a desired dry thickness depending upon the eventual use of the precursor and product articles. For example, the substrate dry thickness (including all treatments and auxiliary layers) can be at least 0.001 mm and up to and including 10 mm, and especially for transparent polymeric films, the substrate dry thickness can be at least 0.008 mm and up to and including 0.2 mm.

The substrate used in the precursor and product articles described herein can be provided in various forms, such as for example, individual sheets of any size or shape, and continuous webs such as continuous webs of transparent substrates (including transparent continuous polyester films) that are suitable for roll-to-roll operations. Such continuous webs can be divided or formed into individual first, second, and additional portions on a first supporting surface and a second opposing supporting surface on which can formed the same or different corresponding silver nanoparticle-containing patterns in the different (or individual) portions of a supporting side (such as the first supporting sides) as well as the same or different electrolessly plated copper thin film patterns formed on the corresponding silver nanoparticle-containing patterns.

In many useful embodiments, the substrate is a continuous transparent flexible polymeric film, a metal foil, or a textile web that can be used in various continuous manufacturing operations.

Forming Silver Nanoparticles and Silver Nanoparticle Patterns

Articles are prepared according to the present invention using (d) silver nanoparticles produced by subjecting a non-aqueous silver precursor composition according to this invention (details described above) to a temperature of at least 20° C. for a time sufficient to convert at least 90 mol % of the (b) reducible silver ions to silver metal in the form of (d) silver nanoparticles having a mean particle size of at least 25 nm and up to and including 750 nm, thereby forming a non-aqueous silver nanoparticle-containing composition. In most embodiments, conversion of at least 95 mol % of the (b) reducible silver ions, or of at least 98 mol % of the (b) reducible silver ions, to (d) silver nanoparticles is possible.

In some embodiments, (b) reducible silver ions can be present in the non-aqueous silver precursor composition in an amount of at least 0.1 weight % and up to and including 5 weight %, or at least 0.25 weight % and up to and including 4 weight %, based on (or relative to) the total weight of the one or more (a) polymers, and such compositions are particularly useful for providing larger or solid areas in an applied pattern on a substrate.

Alternatively, (b) reducible silver ions can be present in the non-aqueous silver precursor composition in an amount of at least 0.1 weight % and up to and including 400 weight %, or at least 15 weight % and up to and including 200 weight %, based on (or relative to) the total weight of the one or more (a) polymers. Such compositions are particularly useful for printing fine lines in an applied pattern on a substrate.

Typically, reduction of (b) reducible silver ions to (d) silver nanoparticles can be carried out by mixing one or more cellulosic polymers as described above in an (c) organic solvent medium comprising at least one or more (i) hydroxylic solvents (and optionally one or more (ii) aprotic solvents) as defined above, with stirring at a temperature of at least 20° C. to obtain a non-aqueous polymer solution comprising the one or more cellulosic polymers in the organic solvent medium. A source of (b) reducible silver ions, such as a silver salt or silver complex as described above is then added to the non-aqueous polymer solution at a suitable temperature and the resulting non-aqueous silver precursor composition is then stirred at 20° C. or higher for up to 48 hours to reduce the (b) reducible silver ions. It is particularly useful to expedite silver ion reduction by heating the non-aqueous silver precursor composition at a temperature of at least 500 and up to and including 100° C. for at least 1 minute and up to and including 1 hour, using a heating mantle or an oil bath.

After or during this silver ion reduction process, one or more (ii) nitrile-containing aprotic solvents, carbonate-containing aprotic solvents, or both types of aprotic solvents, can be added to the non-aqueous silver nanoparticle-containing composition (silver ion reduction may not be complete at this point). The amounts added can be sufficient to provide a desired 9:1 volume ratio of (i) hydroxylic organic solvents to (ii) aprotic organic solvents in the overall (c) organic solvent medium. Typically, the non-aqueous silver nanoparticle-containing composition is cooled sufficiently for this (ii) aprotic solvent addition. As noted above, some of the aprotic solvents can be present in the original (c) organic solvent medium.

If carbon black is to be included in the non-aqueous silver nanoparticle-containing composition, it can be added at this point, typically at room temperature at the appropriate amounts described above (at least 5 weight % and up to and including 50 weight %, based on the total amount of the one or more (a) polymers), using a suitable mixing means such as a shear mixer. For example, suitable shear mixers are commercially available from various sources such as Silverson, Admix, and Ross, for suitable dispersion of the carbon black particles within the non-aqueous silver nanoparticle-containing composition.

The non-aqueous silver nanoparticle-containing composition is then disposed onto one or more supporting surfaces of a substrate (as defined above) to provide, upon drying, either a thin uniform film, or one or more patterns of the non-aqueous silver nanoparticle-containing composition. Disposition of the non-aqueous silver nanoparticle-containing composition can be achieved in a variety of means known in the art for applying solutions or dispersions to a solid substrate.

For example, in some embodiments, a non-aqueous silver nanoparticle-containing composition according to the present invention can be disposed in a uniform or patternwise manner onto one or both supporting sides of the substrate as defined above. For example, a variety of films, including polymeric films composed of polyethylene, polypropylene, biaxially oriented polypropylene, polyethylene terephthalate, polybutylene terephthalate and polyamide, can be utilized as suitable transparent substrates. The choice of substrate structure is not, however, limited to films but includes any material that can be formed into bags, shrink wrap, plates, cartons, boxes, bottles, crates, and other containers. The non-aqueous silver nanoparticle-containing composition deposition or application can be carried out for example, using uniform inkjet printing or using a blade coating, gap coating, slot die coating, X-slide hopper coating, or knife on roll operations.

The non-aqueous silver nanoparticle-containing composition can be disposed on the substrate (one or both supporting surfaces) in a patternwise manner using techniques described below such as flexographic printing, screen printing, or inkjet printing to provide one or more silver nanoparticle-containing patterns on the substrate.

Any applied pattern of non-aqueous silver nanoparticle-containing composition can comprise a grid of fine lines (or other shapes including circles or an irregular network) as described above and the optimal dry thickness (or width) can be tailored for an intended use.

In some embodiments, the same or different silver nanoparticle-containing pattern can be provided in a suitable manner in different portions on both the first supporting surface and the second opposing supporting surface of the substrate to form a "duplex" or dual-sided precursor article, and such patterns can be provided using the same or different non-aqueous silver nanoparticle-containing composition.

In many embodiments, a non-aqueous silver nanoparticle-containing composition can be applied on one or both supporting surfaces of the substrate (for example as a roll-to-roll web) using flexographic printing with an elastomeric relief element such as those derived from flexographic printing plate precursors, many of which are known in the art. Some such precursors are commercially available, for example as the CYREL® Flexographic Photopolymer Plates from DuPont and the Flexcel SR and NX Flexographic plates from Eastman Kodak Company.

Useful elastomeric relief elements are derived from flexographic printing plate precursors and flexographic printing sleeve precursors, each of which can be appropriately imaged (and processed if needed) to provide the elastomeric relief elements for "printing" suitable silver nanoparticle-containing patterns. Useful precursors of this type are described for example, in U.S. Pat. No. 7,799,504 (Zwadlo et al.) and U.S. Pat. No. 8,142,987 (Ali et al.) and U.S. Patent Application Publication 2012/0237871 (Zwadlo), the disclosures of all of which are incorporated herein by reference. Such flexographic printing precursors can comprise elastomeric photopolymerizable layers that can be imaged through a suitable mask image to provide an elastomeric relief element (flexographic printing plate or flexographic printing sleeve). The resulting relief layer can be same or different depending upon whether the same or different patterns of non-aqueous silver nanoparticle-containing compositions are to be formed on one or both supporting surfaces of the substrate.

In other embodiments, an elastomeric relief element can be provided from a direct (or ablation) laser-engraveable elastomer relief element precursor, with or without integral masks, as described for example in U.S. Pat. No. 5,719,009 (Fan), U.S. Pat. No. 5,798,202 (Cushner et al.), U.S. Pat. No. 5,804,353 (Cushner et al.), U.S. Pat. No. 6,090,529 (Gelbart), U.S. Pat. No. 6,159,659 (Gelbart), U.S. Pat. No. 6,511,784 (Hiller et al.), U.S. Pat. No. 7,811,744 (Figov), U.S. Pat. No. 7,947,426 (Figov et al.), U.S. Pat. No. 8,114,572 (Landry-Coltrain et al.), U.S. Pat. No. 8,153,347 (Veres et al.), U.S. Pat. No. 8,187,793 (Regan et al.), and U.S. Patent Application Publications 2002/0136969 (Hiller et al.), 2003/0129530 (Leinenback et al.), 2003/0136285 (Telser et al.), 2003/0180636 (Kanga et al.), and 2012/0240802 (Landry-Coltrain et al.), the disclosures of all of which are incorporated herein by reference.

When the noted elastomeric relief elements are used to provide patterns, the non-aqueous silver nanoparticle-containing composition can be applied in a suitable manner to the uppermost relief surface (raised surface) in the elastomeric relief element. Then, application to a substrate can be accomplished in a suitable procedure while as little as possible is coated from the sides (slopes) or recesses of the relief depressions. Anilox roller systems or other roller application systems, especially low volume Anilox rollers, below 2.5 billion cubic micrometers per square inch (6.35 billion cubic micrometers per square centimeter) and associated skive knives can be used. In such embodiments, the non-aqueous silver nanoparticle-containing composition can be designed to have optimal viscosity for flexographic printing. When a substrate is moved through the roll-to-roll handling system from a flexographic printing plate cylinder to an impression cylinder, the impression cylinder applies pressure to the flexographic printing plate cylinder that transfers an image from an elastomeric relief element to the substrate in forming a precursor article according to the present invention.

Each precursor article can be "printed" one or more times using inkjet printing, screen printing, or flexographic printing as a web (for example, a roll-to-roll continuous web) that can contain multiple patterns (or individual precursor articles after cutting) in multiple portions of the continuous web that is passed through various stations. The same or different silver nanoparticle-containing compositions can be applied (for example, printed) on one or both supporting surfaces of the substrate in the continuous roll-to-roll production operation. In many embodiments, different patterns of silver nanoparticle-containing compositions can be formed on each supporting surface.

After deposition of the non-aqueous silver nanoparticle-containing composition onto the substrate, for example, in a patternwise manner, at least 75 weight % and up to and including 100 weight % of the original (c) solvent medium (described above) and any added (ii) nitrile-containing aprotic solvent or carbonate-containing aprotic solvent can be removed in any suitable manner to form a precursor article. For example, ambient drying can be carried out in an open environment, or the article with applied composition(s) can be subject to "active" drying operations and apparatus (for example, heated drying chamber). Useful drying conditions can be as low as room temperature for as little as 5 seconds and up to and including several hours depending upon the manufacturing process. In many processes, such as roll-to-roll manufacturing operations, drying conditions can be employed at any suitable temperature, for example greater than 50° C. to remove at least 75 weight % and up to 100 weight % of all remaining organic solvents within at least 1 second and up to and including 10 seconds or even within 5 seconds.

Thus, as described above, the non-aqueous silver nanoparticle-containing composition can be disposed onto a supporting surface of the substrate in a patternwise manner, for example, using inkjet printing, screen printing, or flexographic printing, to form a silver nanoparticle-containing pattern.

Forming Product Articles

The resulting precursor article described above can be converted to a product article by electrolessly plating a suitable metal onto the corresponding silver nanoparticle-containing pattern to form a corresponding electrically-conductive metal (for example, copper) pattern on the silver nanoparticle-containing pattern. Thus, the silver nanoparticles in the corresponding pattern act as electroless seed metal particles (catalyst) for the metal electroless plating.

The precursor article can be stored for an indeterminate period of time before metal electroless plating is carried out, but in many embodiments of continuous manufacturing operations (such as roll-to-roll operations), the precursor article is immediately immersed in a suitable aqueous-based electroless metal plating bath or solution.

For example, the precursor article containing catalytic silver nanoparticles in the silver nanoparticle-containing pattern(s) can be contacted with an electroless plating metal that is the same as or different from the catalytic electroless seed silver nanoparticles. In most embodiments, the electroless plating metal is a different from silver.

Any metal that will likely electrolessly "plate" on the catalytic electroless seed silver nanoparticles can be used at this point, but in most embodiments, the electroless plating metal can be for example copper(II), gold(IV), palladium (II), platinum(II), nickel(II), chromium(II), and combinations thereof. Copper(II), nickel (II), platinum(II), and palladium(II) are particularly useful electroless plating metals. The one or more electroless plating metals can be present in the aqueous-based electroless plating bath or solution in an amount of at least 0.01 weight % and up to and including 20 weight % based on total solution weight. Electroless plating can be carried out using known temperature and time conditions, as such conditions are well known in various textbooks and scientific literature. It is also known to include various additives such as metal complexing agents or stabilizing agents in the aqueous-based electroless plating solutions. Variations in time and temperature can be used to change the metal electroless plating thickness or the metal electroless plating deposition rate.

A useful aqueous-based electroless plating solution or bath is an electroless copper(II) plating bath that contains formaldehyde as a reducing agent. Ethylenediaminetetraacetic acid (EDTA) or salts thereof can be present as a copper complexing agent. For example, copper electroless plating can be carried out at room temperature for several seconds and up to several hours depending upon the desired deposition rate and plating rate and plating metal thickness.

Other useful aqueous-based electroless plating solutions or baths comprise copper(II) with EDTA and dimethylamineborane, copper(II) with citrate and hypophosphite, nickel (II) with lactic acid, acetic acid, and a hypophosphite, and other industry standard aqueous-based electroless baths or solutions such as those described by Mallory et al. in *Electroless Plating: Fundamentals and Applications* 1990.

After the electroless plating procedure, the resulting product article can be removed from the aqueous-based electroless plating bath or solution and washed using distilled water or deionized water or another aqueous-based solution to remove any residual electroless plating chemistry.

To change the surface of the electroless plated metal for visual or durability reasons, it is possible that a variety of post-treatments can be employed including surface plating of still at least another (third or more) metal such as nickel or silver on the electrolessly plated metal (this procedure is sometimes known as "capping"), or the creation of a metal oxide, metal sulfide, or a metal selenide layer that is adequate to change the surface color and scattering properties without reducing the conductivity of the electrolessly plated (second) metal.

As one skilled in the art should appreciate, the individual silver nanoparticle deposition and electroless plating features described above can be carried out two or more times before proceeding to the next procedure or step. For example, multiple depositions of a non-aqueous silver nanoparticle-containing composition can be carried out to provide more catalytic metal followed by multiple electroless plating treatments. Sequential washing or rinsing steps can also be carried out where appropriate.

The cumulative result of the described features and operations is a product article as described above comprising the substrate (for example, individual sheets or a continuous web) having one or more electrically-conductive metal-containing thin film patterns on one or both supporting surfaces of the substrate.

The one or more electrolessly plated and electrically-conductive metal patterns formed in the product article can be further "processed" or operated on in various manufacturing operations to incorporate them, individually or in combination, into various devices including but not limited to touch screens or other display devices that can be used in numerous industrial, consumer, and commercial products.

Systems and methods of fabricating flexible and optically compliant touch sensors in a high-volume roll-to-roll manufacturing process wherein micro electrically-conductive features can be created in a single pass are possible using the present invention. The ink jettable or flexographic printable non-aqueous silver nanoparticle-containing compositions according to the present invention can be used to prepare such systems and methods with one or more ink jet printing devices or one or more flexographic printing members to form multiple high resolution electrically-conductive images or patterns after electroless plating.

In other embodiments, the present invention can be used to generate electrically-conductive metal patterns and electrodes within devices, including but not limited to, membrane touch switch (MTS), battery testers, biomedical, electroluminescent lamps, radio frequency identification (RFID) antenna, flat panel displays such as plasma display panel (PDP) and organic light emitting diode (OLED) display, printed transistors and circuits, thin film photovoltaics, and other devices that would be readily apparent to one skilled in the art. In other words, such product articles according to this invention can be devices themselves rather than articles that are incorporated into a device. Alternatively, the product articles are devices into which other product articles are incorporated.

The present invention provides at least the following embodiments and combinations thereof, but other combinations of features are considered to be within the present invention as a skilled artisan would appreciate from the teaching of this disclosure:

1. An article comprising a substrate, and having disposed on a supporting surface thereof, a pattern of a dry silver nanoparticle-containing composition comprising:

at least 20 weight % of one or more (a) polymers, based on the total weight of the pattern, which one or more (a) polymers are selected from one or more of cellulose acetate, cellulose acetate phthalate, cellulose acetate butyrate, cellulose acetate propionate, cellulose acetate trimellitate, hydroxypropylmethyl cellulose phthalate, methyl cellulose, ethyl cellulose, hydroxypropyl cellulose, hydroxyethyl cellulose, hydroxypropylmethyl cellulose, and carboxymethyl cellulose;

(d) silver nanoparticles having a mean particle size of at least 25 nm and up to and including 750 nm, that are present in the pattern in an amount of at least 0.1 weight % and up to and including 400 weight %, based on the total weight of the one or more (a) polymers;

(e) carbon black in an amount of at least 5 weight % and up to and including 50 weight %, based on the total weight of the one or more (a) polymers; and less than 5 mol % of (b) reducible silver ions, based on the total molar amount of silver in the dry silver nanoparticle-containing composition.

2. The article of embodiment 1, wherein the (d) silver nanoparticles have a mean particle size of at least 50 nm and up to and including 300 nm.

3. The article of embodiment 1 or 2, wherein the (d) silver nanoparticles are present in an amount of at least 0.1 weight % and up to and including 5 weight %, based on the total weight of the one or more (a) polymers.

4. The article of any of embodiments 1 to 3, wherein the (d) silver nanoparticles are present in an amount of at least 15 weight % and up to and including 200 weight %, based on the total weight of the one or more (a) polymers.

5. The article of any of embodiments 1 to 4, wherein the substrate is a continuous flexible polymeric film, a metal foil, or a textile web.

6. The article of any of embodiments 1 to 5, wherein the substrate is a transparent continuous polymeric film.

7. The article of any of embodiments 1 to 6, wherein the one or more (a) polymers comprise one or more of carboxymethyl cellulose, cellulose acetate butyrate, cellulose acetate propionate, cellulose acetate, and hydroxypropyl cellulose.

8. The article of any of embodiments 1 to 7, wherein the pattern of the dry silver nanoparticle-containing composition comprises a combination of fine lines, each fine line having an average dry width of at least 0.1 µm and up to and including 20 µm, which combination of fine lines can be arranged in parallel, crossing at any desired angle, a combination thereof; or in a random arrangement.

9. The article of any of embodiments 1 to 8, wherein the substrate has a first supporting surface and a second opposing supporting surface, and one or more patterns of the dry silver nanoparticle-containing composition are disposed on the first supporting surface, and optionally, one or more patterns of the same or different dry silver nanoparticle-containing composition is disposed on the second opposing supporting surface.

10. The article of any of embodiments 1 to 9, wherein the substrate is a transparent continuous polyester film that has a first supporting surface and a second opposing supporting surface, the article further comprising multiple individual patterns formed on the first supporting surface which one or more multiple individual patterns comprise the same or different dry silver nanoparticle-containing compositions, and further comprising multiple opposing patterns formed on the second opposing supporting surface that comprise the same or different dry silver nanoparticle-containing compositions.

11. The article of embodiment 10, wherein all of the multiple individual patterns on both the first supporting surface and the second opposing supporting surface comprise the same dry silver nanoparticle-containing composition, the (d) silver nanoparticles in each individual pattern having a mean particle size of at least 50 nm and up to and including 300 nm, and each of the multiple individual patterns comprising fine lines having an average dry width of at least 0.1 µm and up to and including 20 µm.

12. The article of any of embodiments 1 to 11, wherein the pattern of the dry silver nanoparticle-containing composition further comprises at least 5 weight % and up to and including 25 weight % of a carbon black, based on the total weight of the one or more (a) polymers.

13. The article of any of embodiments 1 to 12, further comprising a pattern of electrolessly plated metal that is disposed solely on the pattern of the dry silver nanoparticle-containing composition.

14. The article of embodiment 13, wherein the substrate has a first supporting surface and a second opposing supporting surface, and comprises one or more patterns of electrolessly plated metal disposed on the first supporting surface, and optionally, one or more patterns of electroless plated metal disposed on the second opposing supporting surface.

15. The article of embodiment 13 or 14, wherein the substrate is a transparent continuous polyester film that has a first supporting surface and a second opposing supporting surface, the article further comprising multiple individual patterns of electrolessly plated copper formed on the first supporting surface, and comprising multiple individual patterns of electrolessly plated copper formed on the second opposing supporting surface.

16. The article of any of embodiments 13 to 15, wherein the electrolessly plated metal is copper.

The following Examples are provided to illustrate the practice of this invention and are not meant to be limiting in any manner.

Invention Example 1: Preparation of Non-Aqueous Silver Nanoparticle Composition in 2-Methoxyethanol In a three-necked round bottomed flask, cellulose acetate (7.5 grams, Sigma Aldrich, 39.7 weight % acetyl, $M_n$~50,000 by GPC) was dissolved in 2-methoxyethanol (138.75 grams) as the organic solvent medium by stirring at 90° C. for 30 minutes to obtain a 5 weight % solution of cellulose acetate in 2-methoxyethanol. The resulting solution was cooled to room temperature and silver nitrate (3.75 grams) was added while stirring to provide reducible silver ions. The resulting non-aqueous silver precursor composition was heated at 90-100° C. for 10-20 minutes using a heating mantle.

An amber-colored non-aqueous silver nanoparticle-containing composition was obtained and slowly cooled (over 30 minutes) to room temperature, and it contained 33 weight % of silver nanoparticles with respect to the weight of cellulose acetate polymer (that was present at about 5 weight %).

An aliquot of the aforementioned amber-colored non-aqueous silver nanoparticle-containing composition was placed in a 0.1 cm cuvette and a UV-Vis absorption spectrum recorded, showing a clear plasmonic band at 430 nm due to the presence of silver nanoparticles in the composition (see FIG. 1). Conversion of reducible silver ions to silver nanoparticles during the heating process was determined by Capillary Electrophoresis to be 97.4 mol %.

Figure 2:
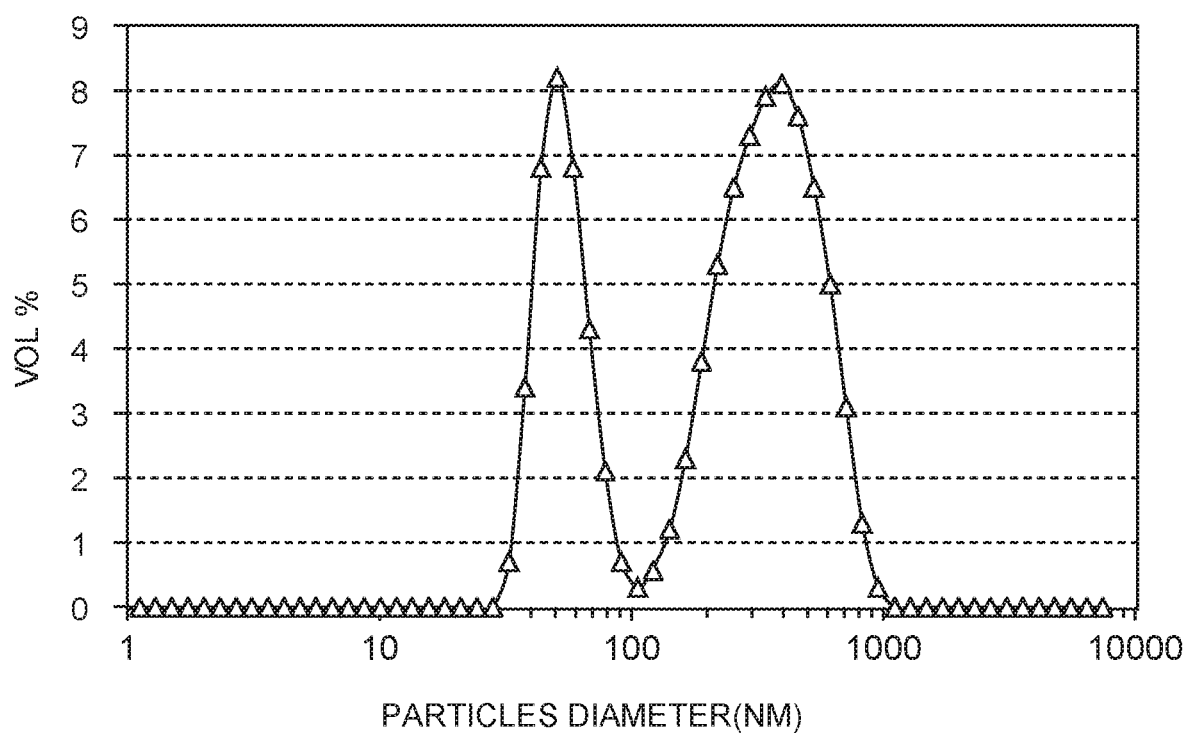
FIG. 2 is a graphical representation of a bimodal silver nanoparticle size distribution as described for Invention Example 1 below.

Particle size distribution was measured using a dynamic light scattering method (Malvern Instruments Ltd. Zetasizer Nano-ZS (ZEN) Dynamic Light Scattering or QELS: Quasi-Elastic Light Scatter), and the mean silver nanoparticle particle diameter [Dv (50%)] was determined. The size distribution of the silver nanoparticles was bimodal with approximately 35 volume % of the silver nanoparticles at 54 nm in size and 65 volume % of the silver nanoparticles at 385 (the mean silver nanoparticle size was 275 nm) (see FIG. 2). Upon extended keeping (30 days) at room temperature, the silver nanoparticle size distribution did not change appreciably (also, see FIG. 2).

Figure 3:
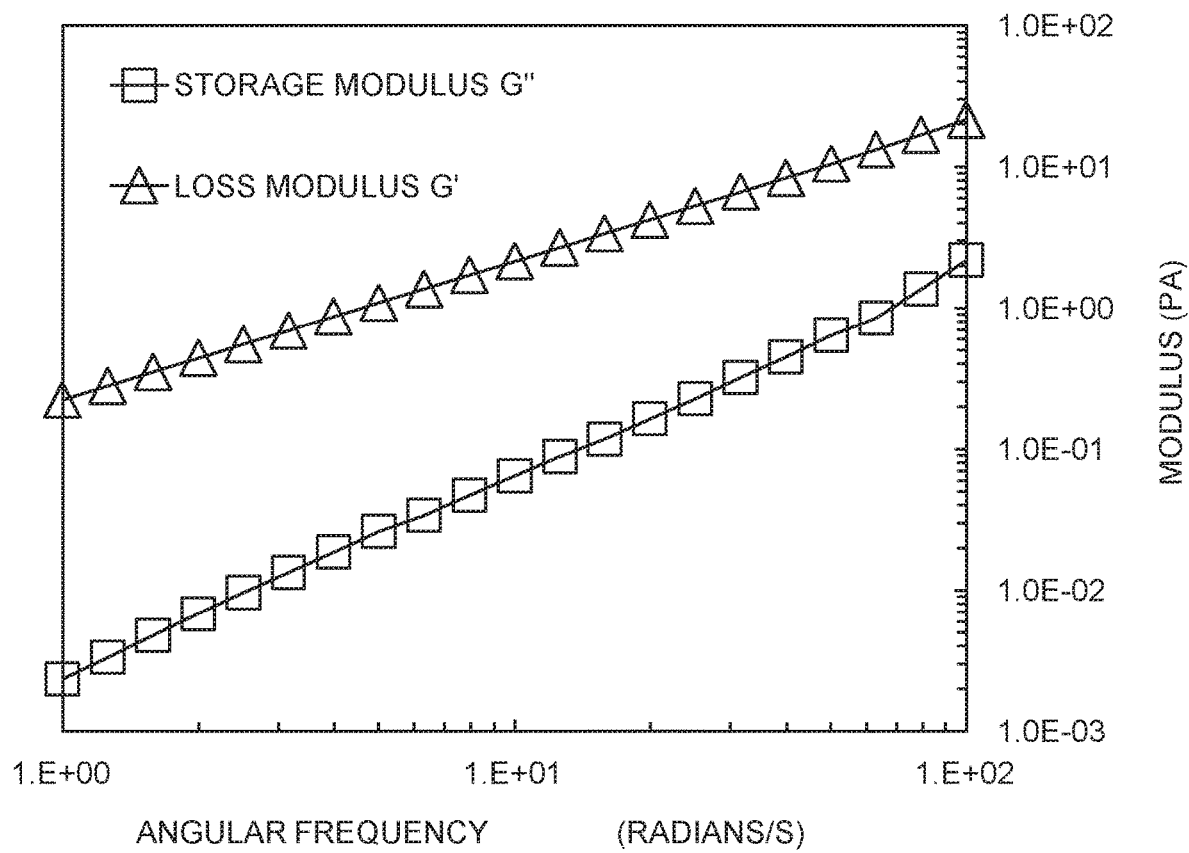
FIG. 3, is a graphical representation of G' and G" values used to determine Tan (δ) values for the rheological evaluation of a non-aqueous silver nanoparticle-containing composition described below in Invention Example 1.

Rheology Measurement:

A sample of the non-aqueous silver nanoparticle-containing composition described above was evaluated in a MCR 501 with couette geometry at 25° C. with a frequency sweep from 100 to 1 radians/s followed by two consecutive steady shear runs from 1 to 10,000 l/s for the sample. The sample was then loaded into the rheometer at 25° C. and equilibrated before starting a time sweep in dynamic mode to determine G' (see FIG. 3). The Tan δ of the non-aqueous silver nanoparticle-containing composition was determined to be 33.2.

Inventive Example 2: Flexographic Printing of Non-Aqueous Silver Nanoparticle Composition To a sample of the non-aqueous silver nanoparticle-containing composition of Invention Example 1, 10 weight % of propylene carbonate was added and the composition was mixed thoroughly. Fine lines of nominal width 7-10 µm were printed as a pattern on a supporting surface of a transparent poly(ethylene terephthalate) film substrate using this composition as the "ink", a flexographic test printer IGT F1, and flexographic printing members obtained from commercially available Kodak Flexcel NX photopolymer plates that had been imaged using a mask that was written using the Kodak Square Spot laser technology at a resolution of 12,800 dpi.

The "printed" corresponding silver nanoparticle-containing pattern was dried by removing organic solvents at room temperature in air. The nominal height of printed features was between 100 nm and 200 nm and the width of resulting fine lines was about 5-10 µm.

Figure 4:
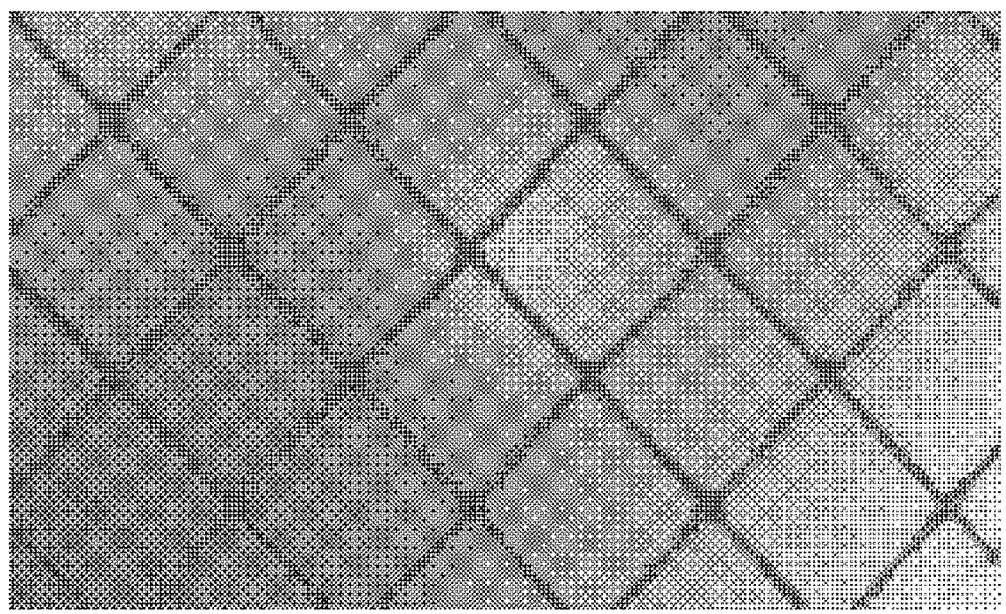
FIG. 4 is a magnified microscopic image of an electrolessly copper plated pattern as described below in Invention Example 2.

The resulting precursor article having a pattern of dried non-aqueous silver nanoparticle-containing composition was immersed in an electroless copper plating bath, ENTHONE® (Enplate LDS CU-406 SC), at 45° C. for 5 minutes using conditions suggested by the commercial supplier. The resulting product article was taken out of the electroless plating bath, rinsed with water, and dried. A pattern of metallic copper was seen on the surface of the corresponding silver nanoparticle pattern in each product article. A micrograph of the printed and electrolessly copper plated product article showed clear printed metallic copper lines as seen in FIG. 4. The nominal height of printed and copper plated features was between 600-1200 nm and the width of the resulting copper plated fine lines was 10-15 µm.

Invention Example 3: Preparation of Non-Aqueous Silver Nanoparticle-Containing Composition in 1-Methoxy-2-propanol In a 25 ml beaker, cellulose acetate propionate (0.5 grams, Eastman CAP 504-0.2) was dissolved in 1-methoxy-2-propanol (9.25 grams) by stirring at 90° C. for 30 minutes. This solution was cooled to room temperature and silver nitrate (0.25 grams) was added while stirring to provide reducible silver ions. The resulting non-aqueous silver precursor composition was heated at 90-110° C. for 10-20 minutes using a hot plate.

An amber-colored non-aqueous silver nanoparticle-containing composition was obtained and slowly cooled (over 30 minutes) to room temperature. The resulting amount of silver nanoparticles was 33 weight % with respect to the weight of the cellulose acetate propionate, and the conversion of reducible silver ions to silver nanoparticles was determined to be 97.7 mol % using Capillary Electrophoresis.

Figure 5:
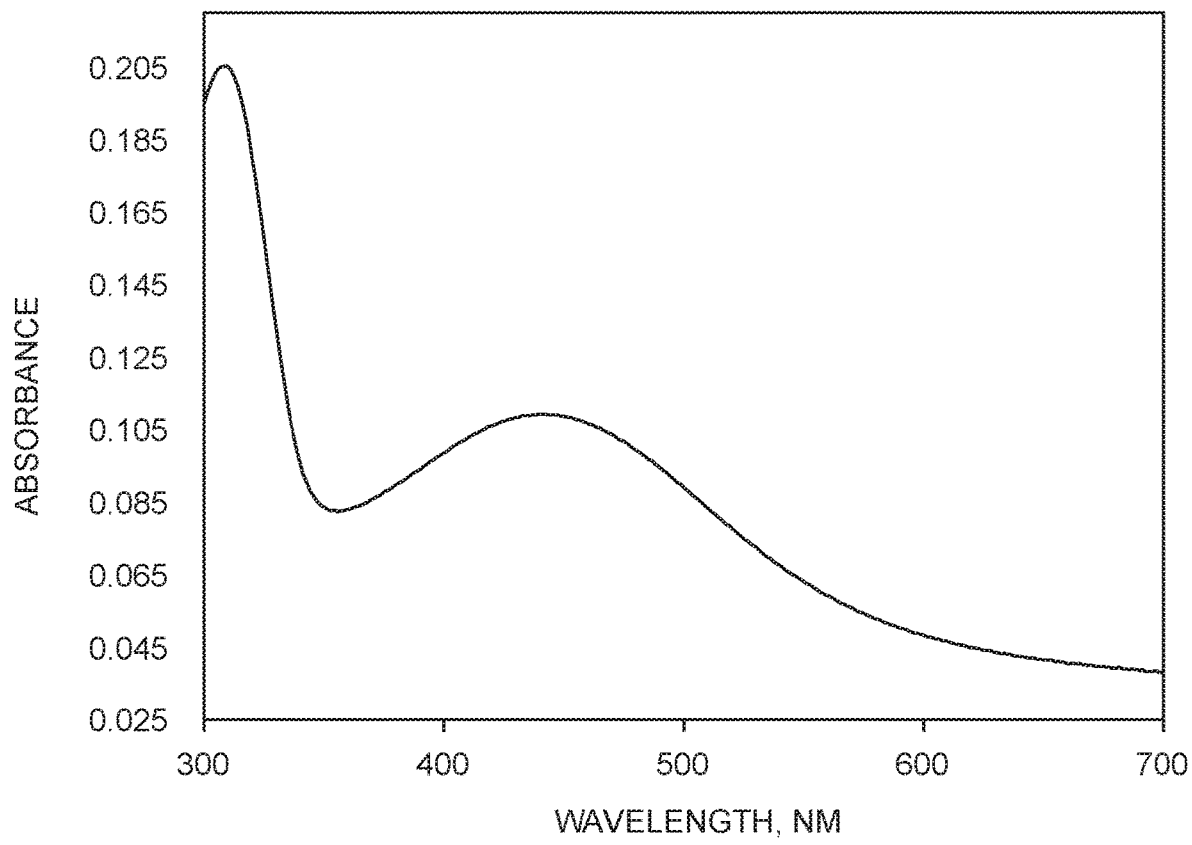
FIG. 5 is a graphical representation of Absorbance vs. Wavelength (nm) for the silver nanoparticle evaluation described below in Invention Example 3.

An aliquot of this amber-colored non-aqueous silver nanoparticle-containing composition was placed in a 0.1 cm cuvette and a UV-Vis absorption spectrum was recorded, showing a clear plasmonic band at 440 nm due to the presence of silver nanoparticles in the composition. An absorption spectrum of another sample after 1 week of storage at ambient conditions showed the same plasmonic band at 440 nm (see FIG. 5) indicating stability of the non-aqueous silver nanoparticle-containing composition. The Tan δ of the non-aqueous silver nanoparticle-containing composition was determined to be 76.1 using the process and equipment described above in Invention Example 1.

Invention Example 4: Flexographic Printing and Copper Electroless Plating of Non-Aqueous Silver Nanoparticle-Containing Composition on a Transparent Polymeric Substrate To a sample of the non-aqueous silver nanoparticle-containing composition described in Invention Example 3, 10 weight % of propylene carbonate was added and the resulting composition was mixed thoroughly. Fine lines of nominal width 7-10 μm were printed on a transparent poly(ethylene terephthalate) film substrate using this composition as the "ink," a flexographic test printer IGT F1, and flexographic printing members obtained from commercially available Kodak Flexcel NX photopolymer plates that had been imaged using a mask that was written using the Kodak Square Spot laser technology at a resolution of 12,800 dpi.

The "printed" corresponding silver nanoparticle-containing pattern was dried in air to remove organic solvents. The nominal height of printed features was between 100 nm and 200 nm and the width of resulting fine lines was about 5-10 μm.

The resulting precursor article having a pattern of dried non-aqueous silver nanoparticle-containing composition was immersed in an electroless copper plating bath, ENTHONE® (Enplate LDS CU-406 SC) at 45° C. for 5 minutes using conditions provided by the commercial supplier. The resulting product article was taken out of the bath, rinsed with water, and dried. A pattern of metallic copper was seen on the surface of the corresponding silver nanoparticle pattern in each product article. An electron photomicrograph of the printed and electrolessly copper plated product article showed clear printed metallic copper lines. The nominal height of printed and copper plated features was between 600 nm and 1200 nm and width of resulting fine lines was 10-15 μm.

Invention Example 5: Preparation of Not-Aqueous Silver Nanoparticles-Containing Composition in 2-methoxyethanol In a three-necked round bottomed flask, cellulose acetate (0.5 grams, Sigma Aldrich, 39.7 weight % acetyl, $M_n$~50,000 by GPC) was dissolved in 2-methoxyethanol (10 grams) by stirring at 90° C. for 30 minutes to obtain a 5 weight % solution of cellulose acetate in the noted hydroxylic organic solvent. The solution was cooled to room temperature and silver lactate-pyridine complex (3.75 grams) (prepared as described in U.S. Ser. No. 15/213,804, noted above) was added while stirring to provide reducible silver ions. The resulting non-aqueous silver precursor composition was heated at 50-70° C. for 10 minutes. A dark amber-colored non-aqueous silver nanoparticle-containing composition was obtained that was slowly cooled (over 30 minutes) to room temperature. This composition had 33 weight % silver nanoparticles with respect to the weight of the cellulose acetate polymer.

Figure 6:
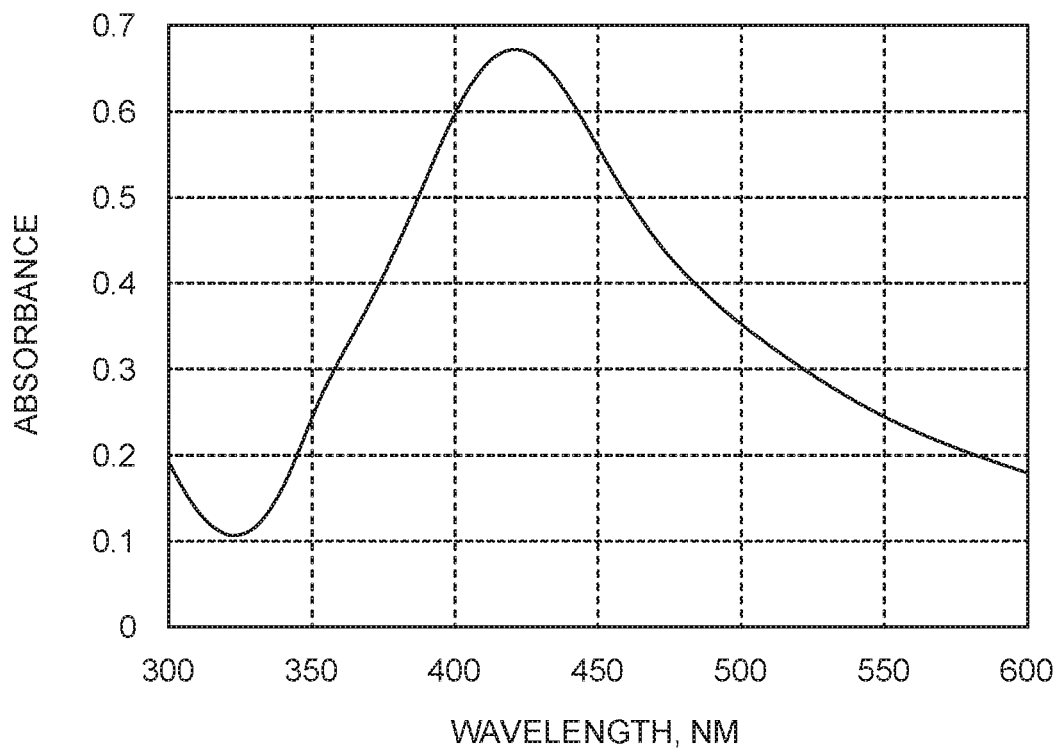
FIG. 6 is a graphical representation of Absorbance vs. Wavelength (nm) for the silver nanoparticle evaluation described below in Invention Example 5.

An aliquot of the amber-colored non-aqueous silver nanoparticle-containing composition was placed in a 0.1 cm cuvette and a UV-Vis absorption spectrum recorded, showing a clear plasmonic band at 420 nm due to the presence of silver particles in the composition (see FIG. 6). Conversion of reducible silver ions to silver nanoparticles from the heating process was determined by Capillary Electrophoresis to be 98 mol %.

Particle size distribution was measured using a light scattering method (Malvern Instruments Ltd. Zetasizer Nano-ZS (ZEN) Dynamic Light Scattering or QELS: Quasi-Elastic Light Scatter), and the median particle diameter [Dv (50%)] was determined using a dynamic light scattering method. The size distribution of silver nanoparticles particles was determined to be bimodal with approx. 32 volume % of the silver nanoparticles at 249 nm and 68 volume % of the silver nanoparticles were at 29 nm (the mean silver nanoparticle size was about 100 nm). Upon extended keeping of 10 days at room temperature, the silver nanoparticle size distribution did not change appreciably.

The Tan δ of the non-aqueous silver nanoparticle composition was determined to be 41.9 using the process and equipment described above in Invention Example 1.

Invention Example 6: Preparation of Non-Aqueous Silver Nanoparticle-Containing Composition in 2-Methoxyethanol In a three-necked round bottomed flask, hydroxypropyl cellulose (2.5 grams, Sigma Aldrich, $M_w$ of 100,000) was dissolved in 2-methoxyethanol (46.25 grams) by stirring at 90° C. for 30 minutes. This solution was cooled to room temperature and silver nitrate (1.25 grams) was added while stirring to provide reducible silver ions. The resulting non-aqueous silver precursor composition was heated at 90-100° C. for 10-20 minutes, followed by slowly cooling (over 30 minutes) to room temperature.

Figure 7:
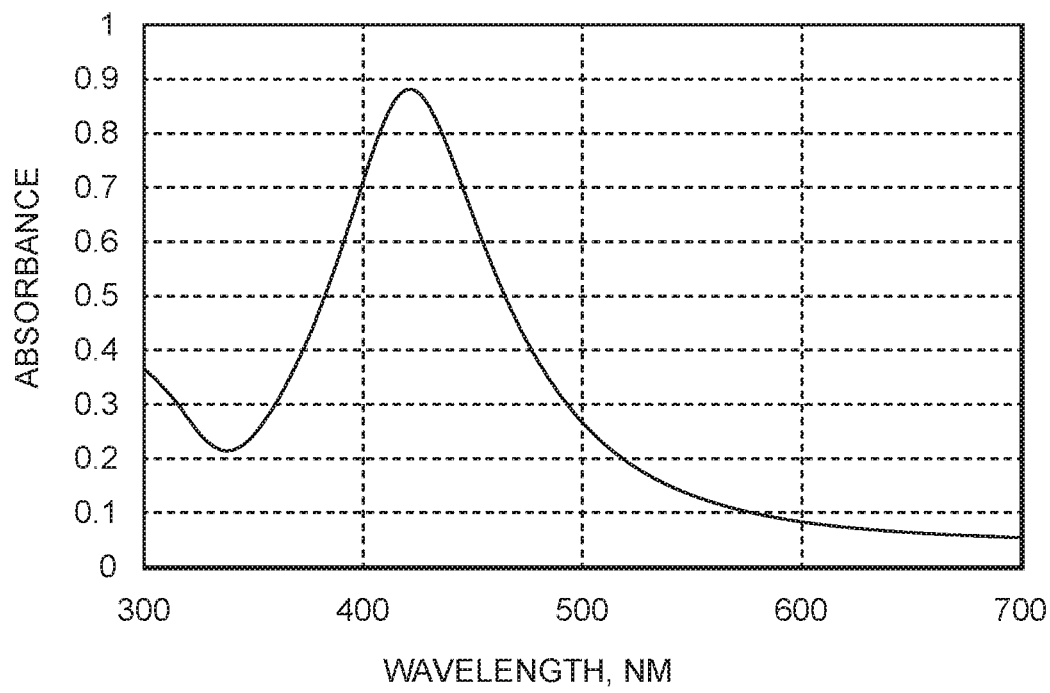
FIG. 7 is a graphical representation of Absorbance vs. Wavelength (nm) for the silver nanoparticle evaluation described below in Invention Example 6.
Figure 8:
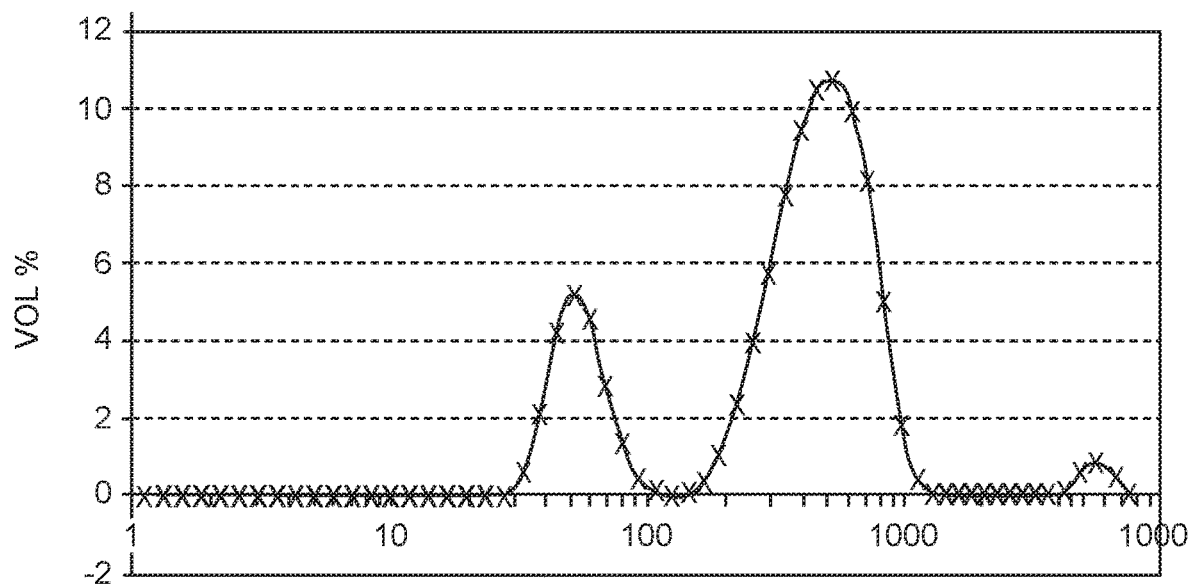
FIG. 8 is a graphical representation of a trimodal silver nanoparticle size distribution as described below for Invention Example 6.

An aliquot of the noted amber-colored non-aqueous silver nanoparticle-containing composition was placed in a 0.1 cm cuvette and a UV-Vis absorption spectrum recorded, showing a clear plasmonic band at 425 nm due to the presence of silver nanoparticles (see FIG. 7). Conversion of the reducible silver ions to silver nanoparticles was determined by Capillary Electrophoresis to be 98 mol %. ZEN Particle Sizing of another aliquot of this example showed a trimodal silver nanoparticle size distribution at 500 nm (77 volume %), 55 nm (21 volume %), and 5400 nm (2 volume %), (see FIG. 8). The amount of silver nanoparticles with respect to the hydroxypropyl cellulose was about 33.3 weight %.

Invention Example 7: Flexographic Printing and Copper Electroless Plating on a Polymeric Substrate To the non-aqueous silver nanoparticle-containing composition of Invention Example 6, benzonitrile was added at 20 weight % of the resulting composition that was then thoroughly mixed.

A pattern of fine lines of nominal width 7-10 μm of this non-aqueous silver nanoparticle-containing composition were printed on a poly(ethylene terephthalate) film substrate using a flexographic test printer IGT F1 and flexographic printing members obtained from commercially available Kodak Flexcel NX photopolymer plates that had been imaged using a mask that was written using the Kodak Square Spot laser technology at a resolution of 12,800 dpi.

Figure 9:
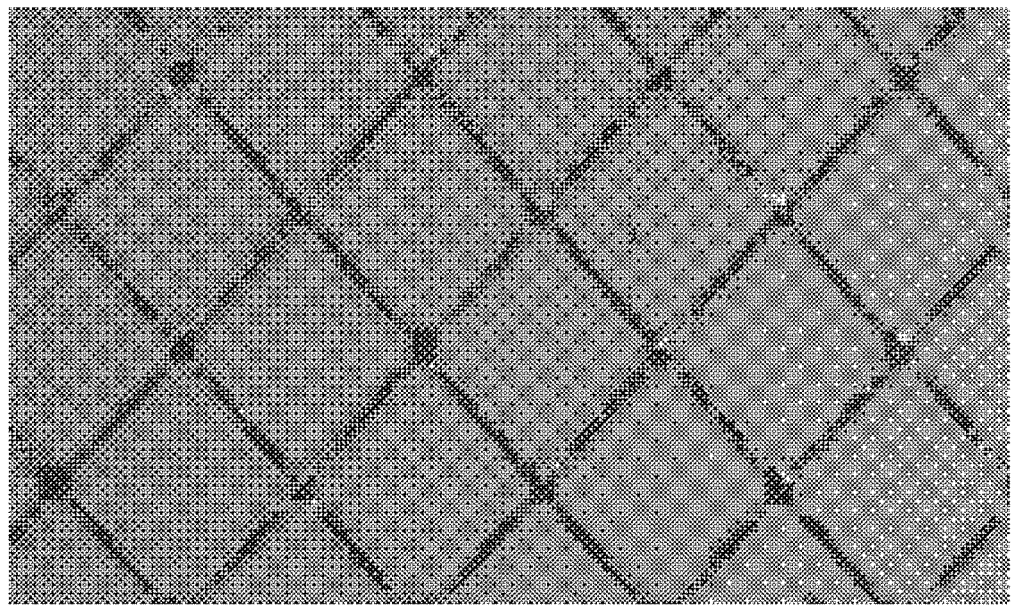
FIG. 9 is a magnified microscopic image of an electrolessly copper plated pattern as described below in Invention Example 7.

The "printed" corresponding silver nanoparticle-containing pattern was dried in air to remove organic solvents, and the dried pattern was electrolessly plated with a Enthone® copper plating chemistry as described above in Invention Example 4 at 40° C., resulting in a copper plated image or pattern (see FIG. 9).

Invention Example 8: Preparation of Non-Aqueous Silver Nanoparticle Containing Composition in 2-Methoxyethanol-Benzonitrile Solvent Mixture In a 25 ml beaker, cellulose acetate (0.5 grams) was dissolved in 2-methoxyethanol (7.4 grams) and benzonitrile (1.85 grams) (2-methoxyethanol:benzonitrile at about 8:2 (w/w)) by stirring at 90° C. for 30 minutes. This organic solvent solution was cooled to room temperature and silver nitrate (0.25 grams) was added while stirring to provide reducible silver ions. The resulting non-aqueous silver precursor composition was heated at 90-110° C. for 10-20 minutes on a hot plate.

Figure 10:
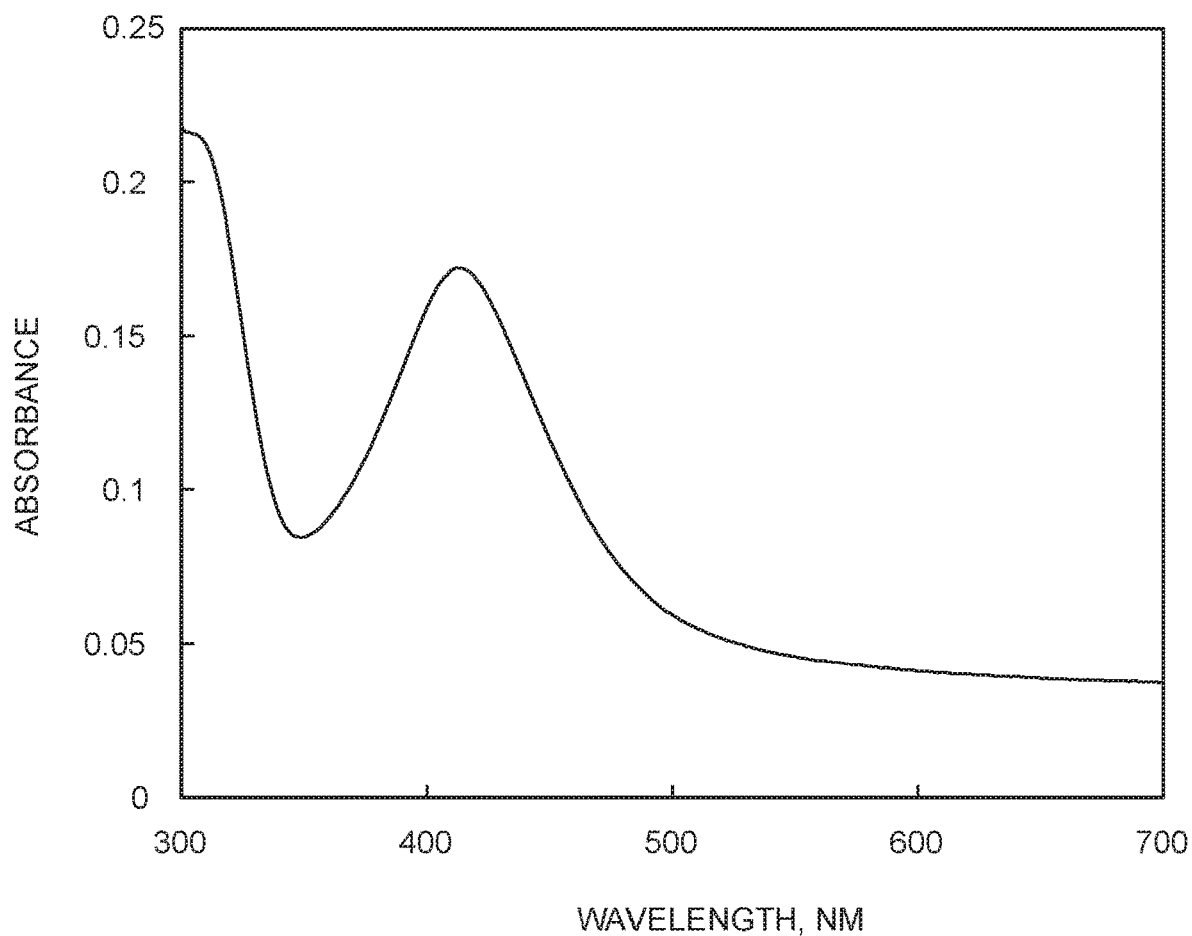
FIG. 10 is a graphical representation of Absorbance vs. Wavelength (nm) for the silver nanoparticle evaluation for Invention Example 8 below.

An amber-colored non-aqueous silver nanoparticle-containing composition was obtained and slowly cooled (over 30 minutes) to room temperature. The resulting amount of silver nanoparticles was 33 weight % with respect to the weight of the cellulose acetate propionate, and the conversion of reducible silver ions to silver nanoparticles was determined to be 97 mol % using Capillary Electrophoresis. Formation of silver nanoparticles was further confirmed by observation of plasmonic band at 420 nm in absorption spectrum (FIG. 10).

Invention Example 9: Addition of Carbon Black to a Preparation of Non-Aqueous Silver Nanoparticles-Containing Composition in 2-methoxyethanol To the non-aqueous silver nanoparticle-containing composition (10 grams) of Invention Example 1, Cabot Mogul-L Carbon was added at 25 weight % (0.125 grams) with respect to cellulose acetate present in the composition. The carbon black was dispersed within the composition using a Silverson L4R high sheer mixer with a ⅜ inch (0.95 cm) Mini-micro mixing head at 12,000 RPM for greater than 5 minutes.

Following procedures described above in previous Invention Examples 2, 4, and 7, fine lines of nominal width of 15 μm were printed as a pattern on a supporting surface of a transparent poly(ethylene terephthalate) film substrate using the described carbon black-containing, non-aqueous silver nanoparticle-containing composition as the "ink".

The "printed" pattern was dried at room temperature in air and was electrolessly copper plated using ENTHONE® (Enplate LDS CU-406 SC), at 40° C. for less than 5 minutes using conditions suggested by the commercial supplier. A pattern of metallic copper was seen on the surface of the corresponding silver nanoparticle pattern in each product article. The nominal height of printed and copper plated features was between 500 nm and 600 nm and the width of fine lines was 10-25 μm.

The invention has been described in detail with particular reference to certain preferred embodiments thereof but it will be understood that variations and modifications can be effected within the spirit and scope of the invention.

The invention claimed is:

1. An article comprising a substrate, and having disposed on a supporting surface thereof, a pattern of a dry silver nanoparticle-containing composition comprising:
   at least 20 weight % of one or more (a) polymers, based on the total weight of the pattern, which one or more (a) polymers are selected from one or more of cellulose acetate, cellulose acetate phthalate, cellulose acetate butyrate, cellulose acetate propionate, cellulose acetate trimellitate, hydroxypropylmethyl cellulose phthalate, methyl cellulose, ethyl cellulose, hydroxypropyl cellulose, hydroxyethyl cellulose, hydroxypropylmethyl cellulose, and carboxymethyl cellulose;
   (d) silver nanoparticles having a mean particle size of at least 25 nm and up to and including 750 nm, that are present in the pattern in an amount of at least 0.1 weight % and up to and including 400 weight %, based on the total weight of the one or more (a) polymers;
   (e) carbon black in an amount of at least 5 weight % and up to and including 50 weight %, based on the total weight of the one or more (a) polymers; and
   less than 5 mol % of (b) reducible silver ions, based on the total molar amount of dry silver in the silver nanoparticle-containing composition.

2. The article of claim 1, wherein the (d) silver nanoparticles have a mean particle size of at least 50 nm and up to and including 300 nm.

3. The article of claim 1, wherein the (d) silver nanoparticles are present in an amount of at least 0.1 weight % and up to and including 5 weight %, based on the total weight of the one or more (a) polymers.

4. The article of claim 1, wherein the (d) silver nanoparticles are present in an amount of at least 15 weight % and up to and including 200 weight %, based on the total weight of the one or more (a) polymers.

5. The article of claim 1, wherein the substrate is a continuous flexible polymeric film, a metal foil, or a textile web.

6. The article of claim 1, wherein the substrate is a transparent continuous polymeric film.

7. The article of claim 1, wherein the one or more (a) polymers comprise one or more of carboxymethyl cellulose, cellulose acetate butyrate, cellulose acetate propionate, cellulose acetate, and hydroxypropyl cellulose.

8. The article of claim 1, wherein the pattern of the dry silver nanoparticle-containing composition comprises a combination of fine lines, each fine line having an average dry width of at least 0.1 μm and up to and including 20 μm, which combination of fine lines can be arranged in parallel, crossing at any desired angle, a combination thereof, or in a random arrangement.

9. The article of claim 1, wherein the substrate has a first supporting surface and a second opposing supporting surface, and one or more patterns of the dry silver nanoparticle-containing composition are disposed on the first supporting surface, and optionally, one or more patterns of the same or different dry silver nanoparticle-containing composition is disposed on the second opposing supporting surface.

10. The article of claim 1, wherein the substrate is a transparent continuous polyester film that has a first supporting surface and a second opposing supporting surface,
the article further comprising multiple individual patterns formed on the first supporting surface which one or more multiple individual patterns comprise the same or different dry silver nanoparticle-containing compositions, and further comprising multiple opposing patterns formed on the second opposing supporting surface that comprise the same or different dry silver nanoparticle-containing compositions.

11. The article of claim 10, wherein all of the multiple individual patterns on both the first supporting surface and the second opposing supporting surface comprise the same dry silver nanoparticle-containing composition, the (d) silver nanoparticles in each individual pattern having a mean particle size of at least 50 nm and up to and including 300 nm, and each of the multiple individual patterns comprising fine lines having an average dry width of at least 0.1 µm and up to and including 20 µm.

12. The article of claim 1, wherein the pattern of the dry silver nanoparticle-containing composition further comprises at least 5 weight % and up to and including 25 weight % of a carbon black, based on the total weight of the one or more (a) polymers.

13. The article of claim 1, further comprising a pattern of electrolessly plated metal that is disposed solely on the pattern of the dry silver nanoparticle-containing composition.

14. The article of claim 13, wherein the substrate is a continuous flexible polymeric film, a metal foil, or a textile web.

15. The article of claim 13, wherein the substrate is a transparent continuous polymeric film.

16. The article of claim 13, wherein the one or more (a) polymers comprise one or more of carboxymethyl cellulose, cellulose acetate butyrate, cellulose acetate propionate, cellulose acetate, or hydroxypropyl cellulose.

17. The article of claim 13, wherein the pattern of electrolessly plated metal comprises a combination of fine lines, each fine line having an average dry width of at least 0.1 µm and up to and including 20 µm, which combination of fine lines can be arranged in parallel, crossing at any desired angle, or a combination thereof or in a random arrangement.

18. The article of claim 13, wherein the substrate has a first supporting surface and a second opposing supporting surface, and comprises one or more patterns of electrolessly plated metal disposed on the first supporting surface, and optionally, one or more patterns of electroless plated metal disposed on the second opposing supporting surface.

19. The article of claim 13, wherein the substrate is a transparent continuous polyester film that has a first supporting surface and a second opposing supporting surface,
the article further comprising multiple individual patterns of electrolessly plated copper formed on the first supporting surface, and comprising multiple individual patterns of electrolessly plated copper formed on the second opposing supporting surface.

20. The article of claim 13, wherein the electrolessly plated metal is copper.

* * * * *